June 23, 1953   R. H. SHADRICK   2,642,649
LATHE CONTROL MECHANISM
Filed May 27, 1946   12 Sheets-Sheet 1
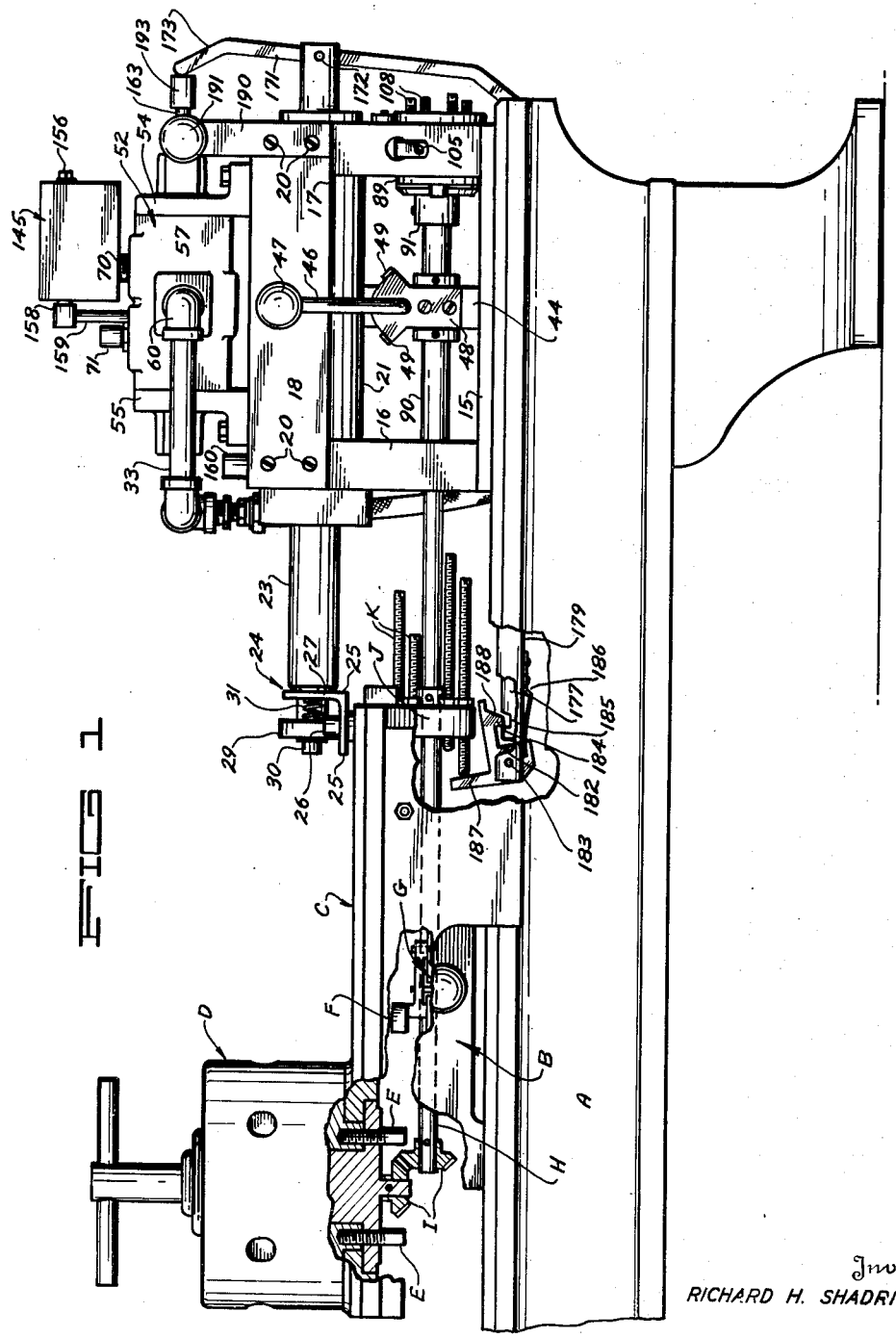
Inventor
RICHARD H. SHADRICK
By Carlsen & Hagle
Attorneys

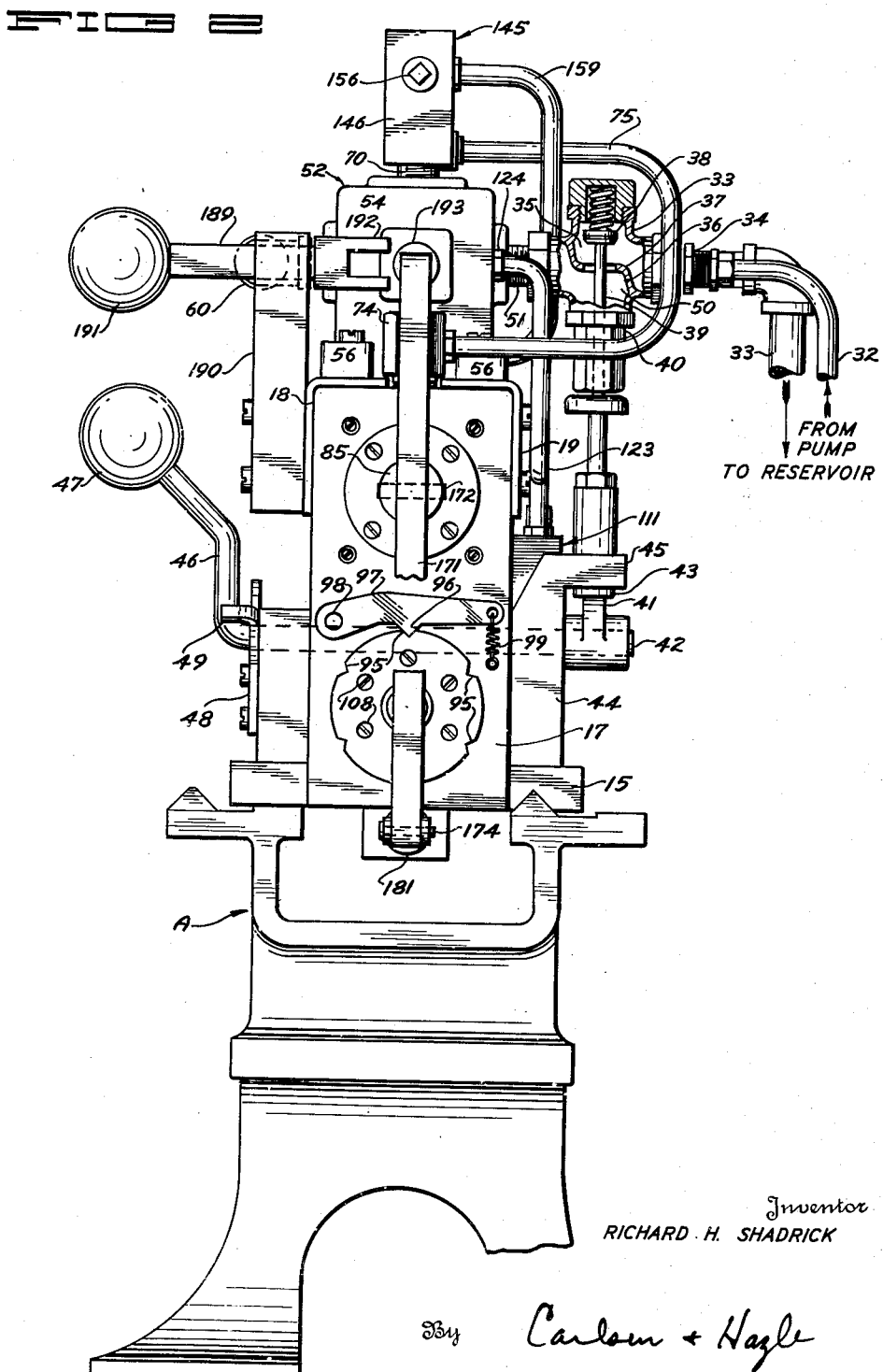

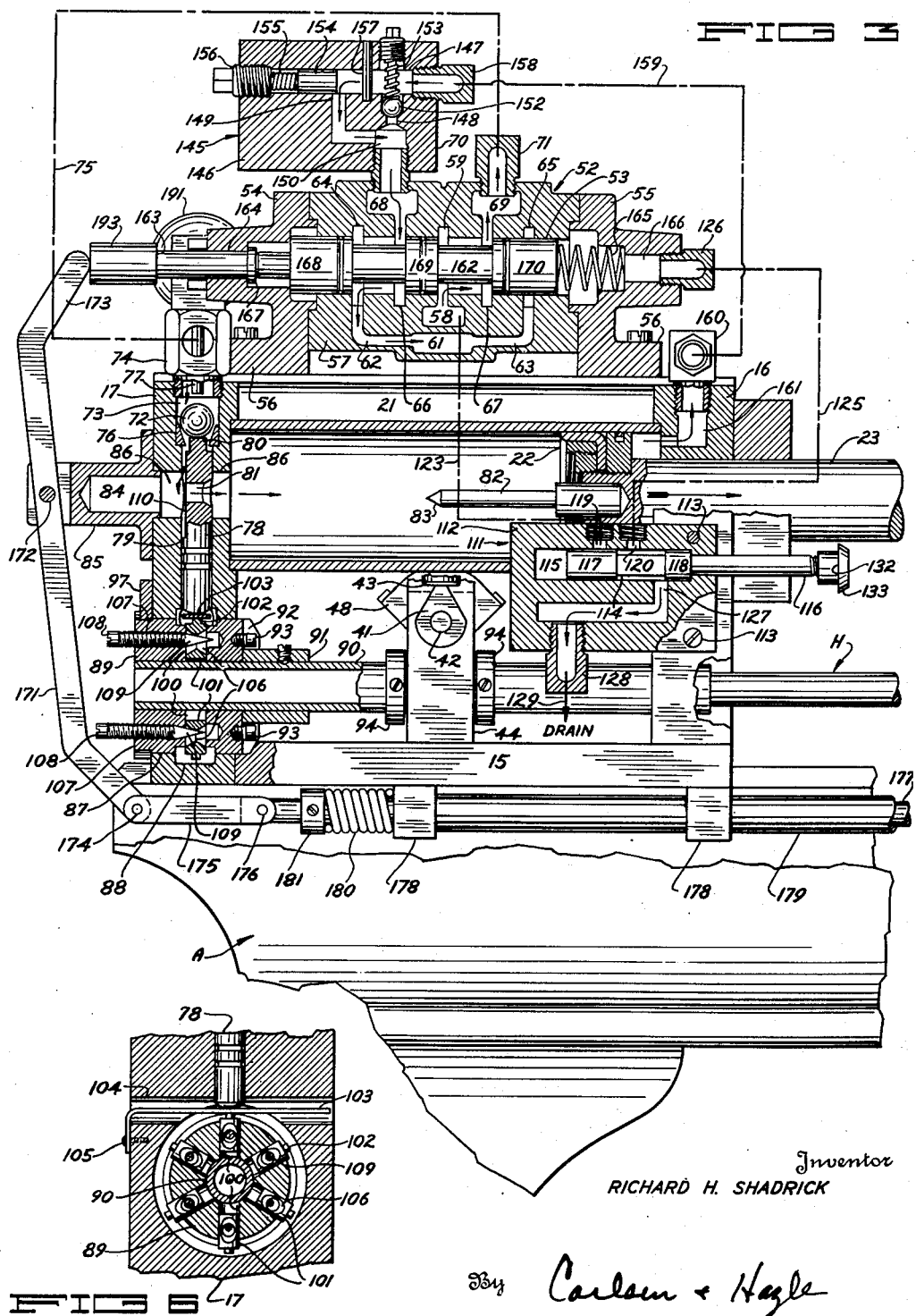

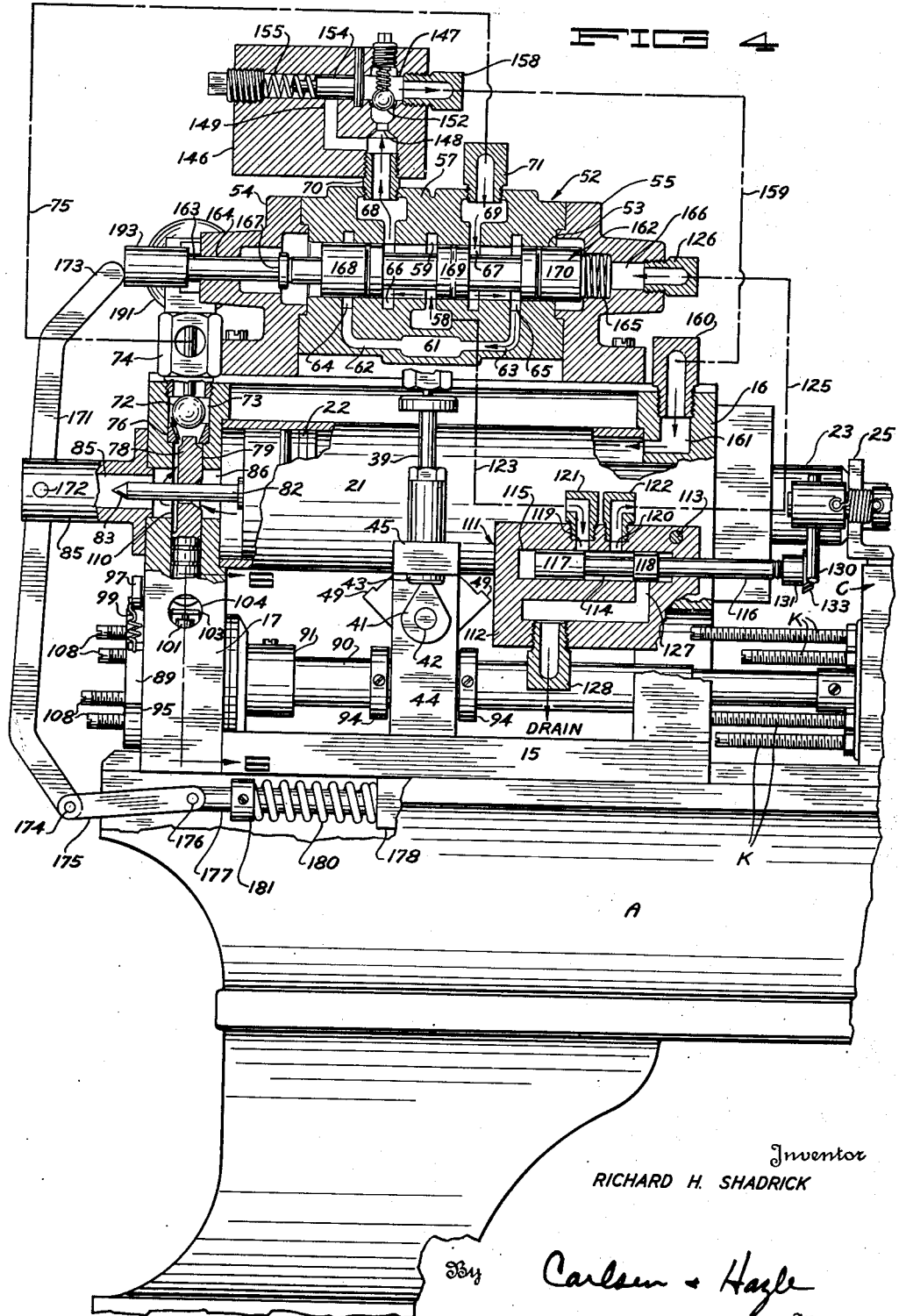

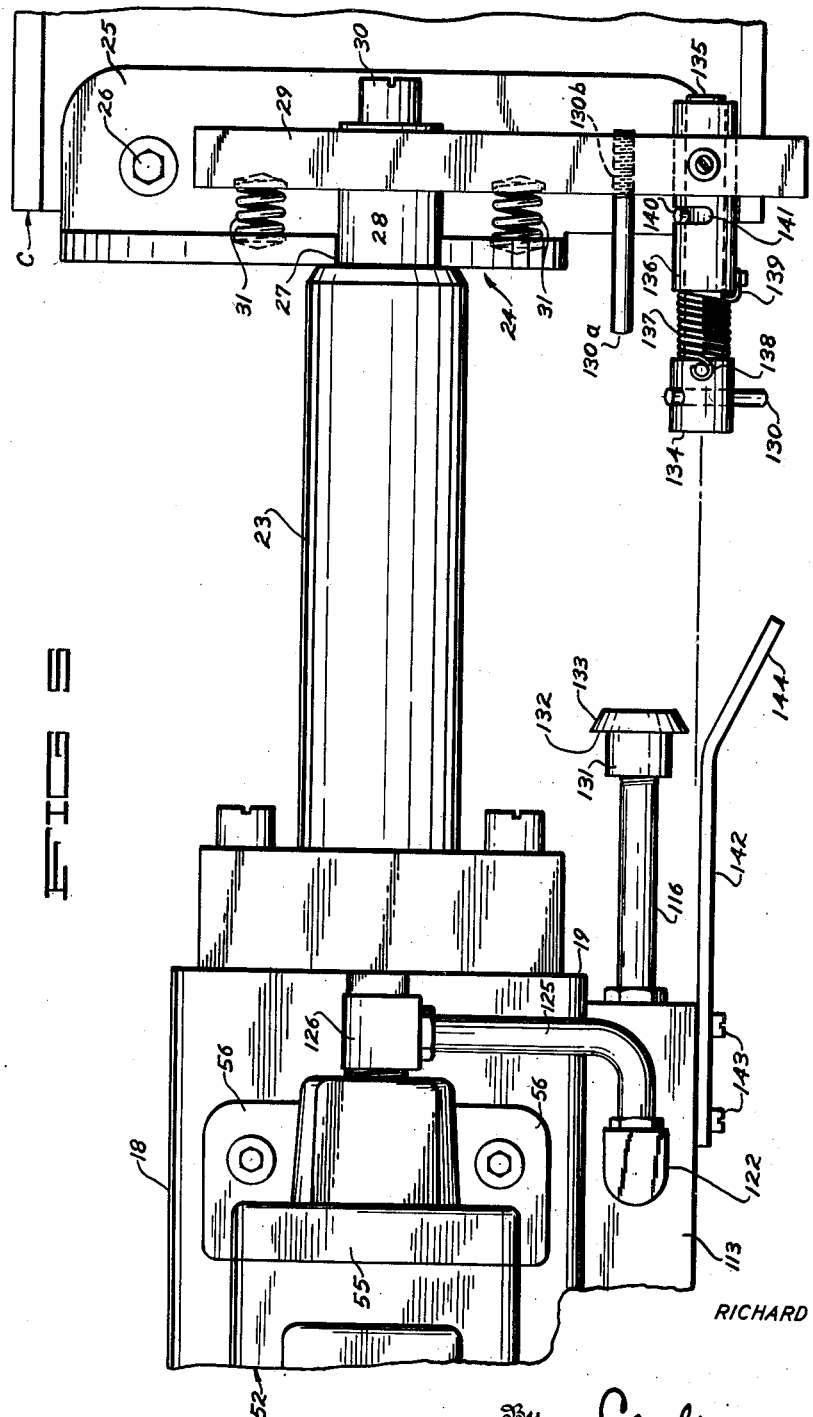

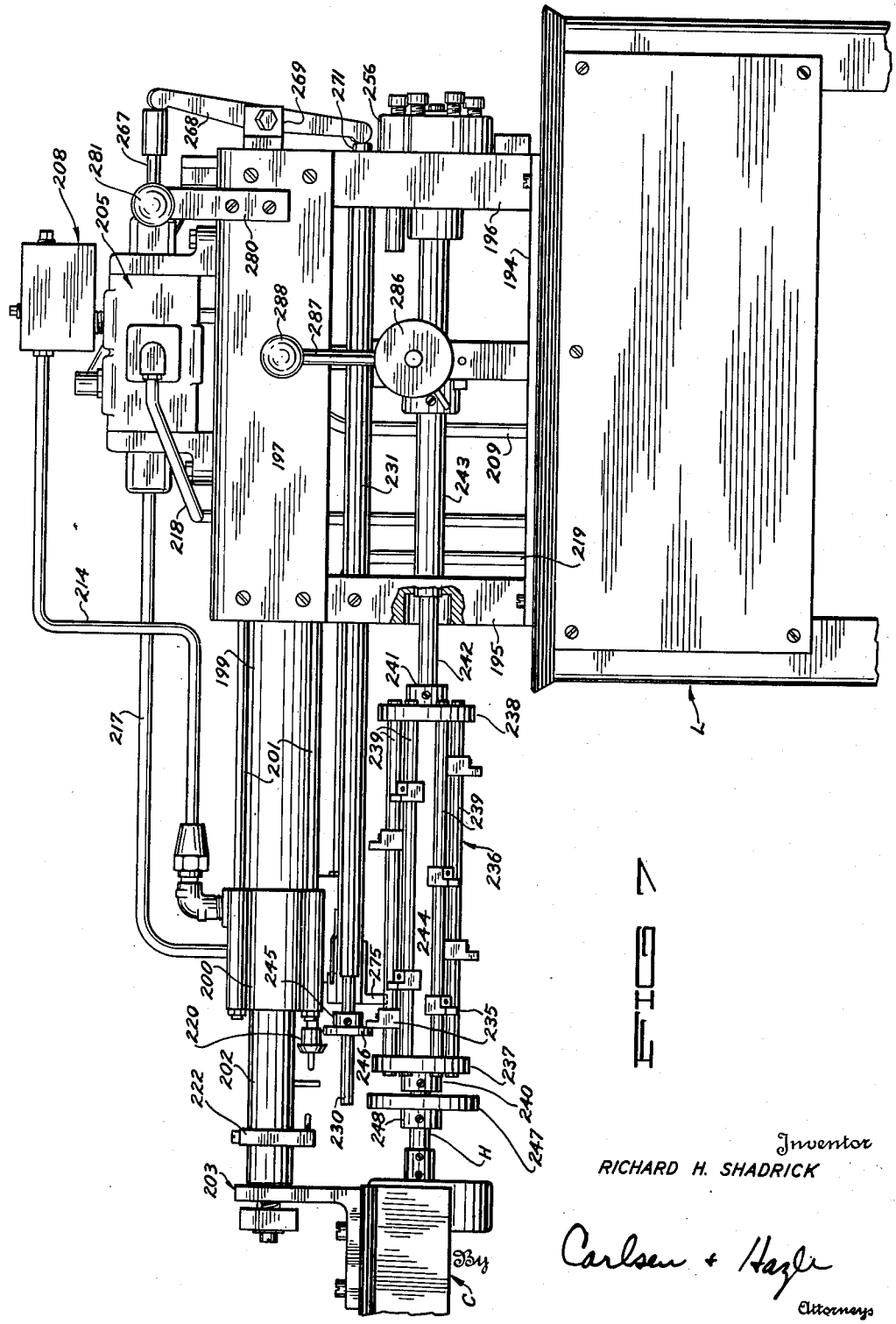

June 23, 1953 R. H. SHADRICK 2,642,649
LATHE CONTROL MECHANISM
Filed May 27, 1946 12 Sheets-Sheet 7
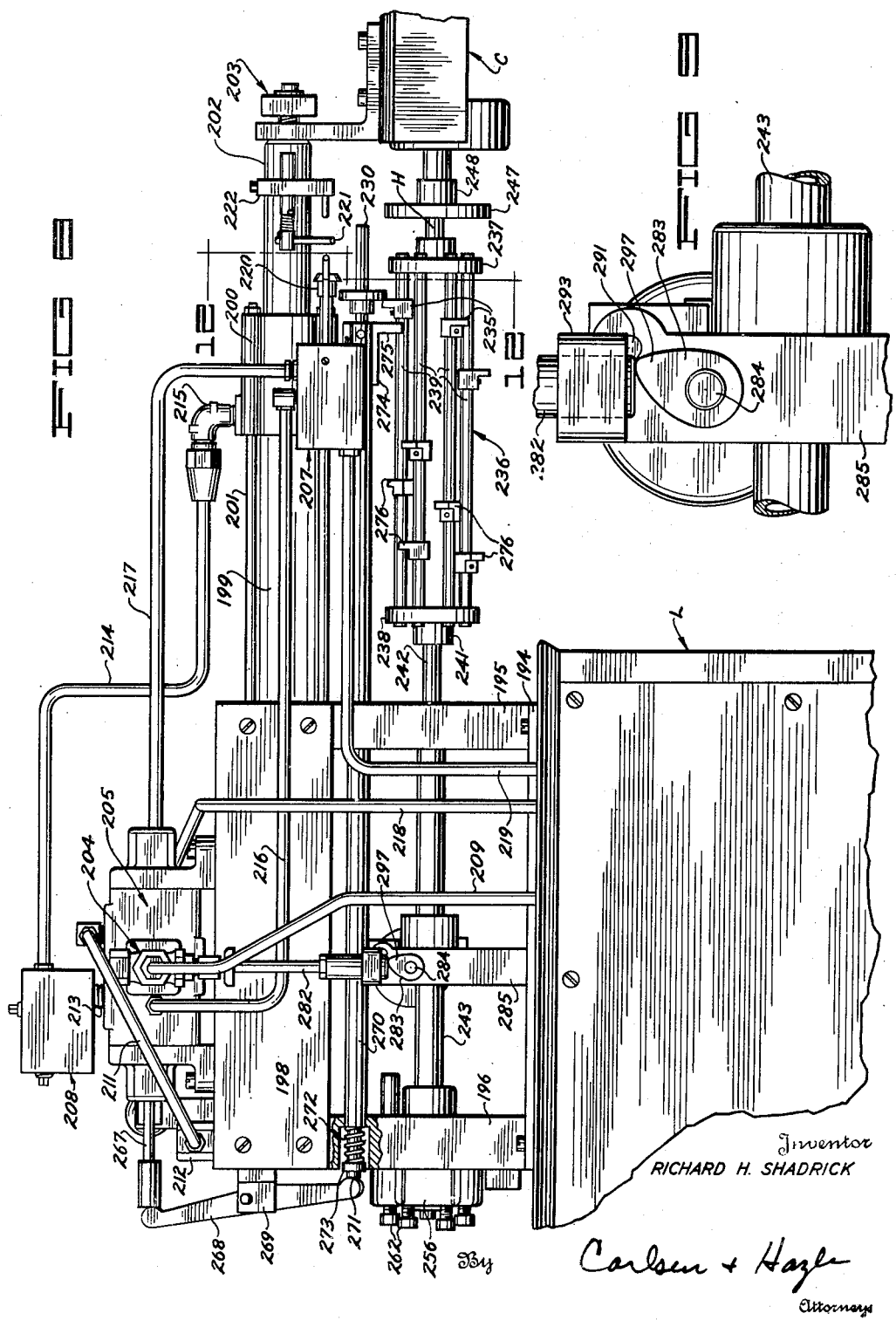
Inventor
RICHARD H. SHADRICK
By Carlsen + Hazle
Attorneys

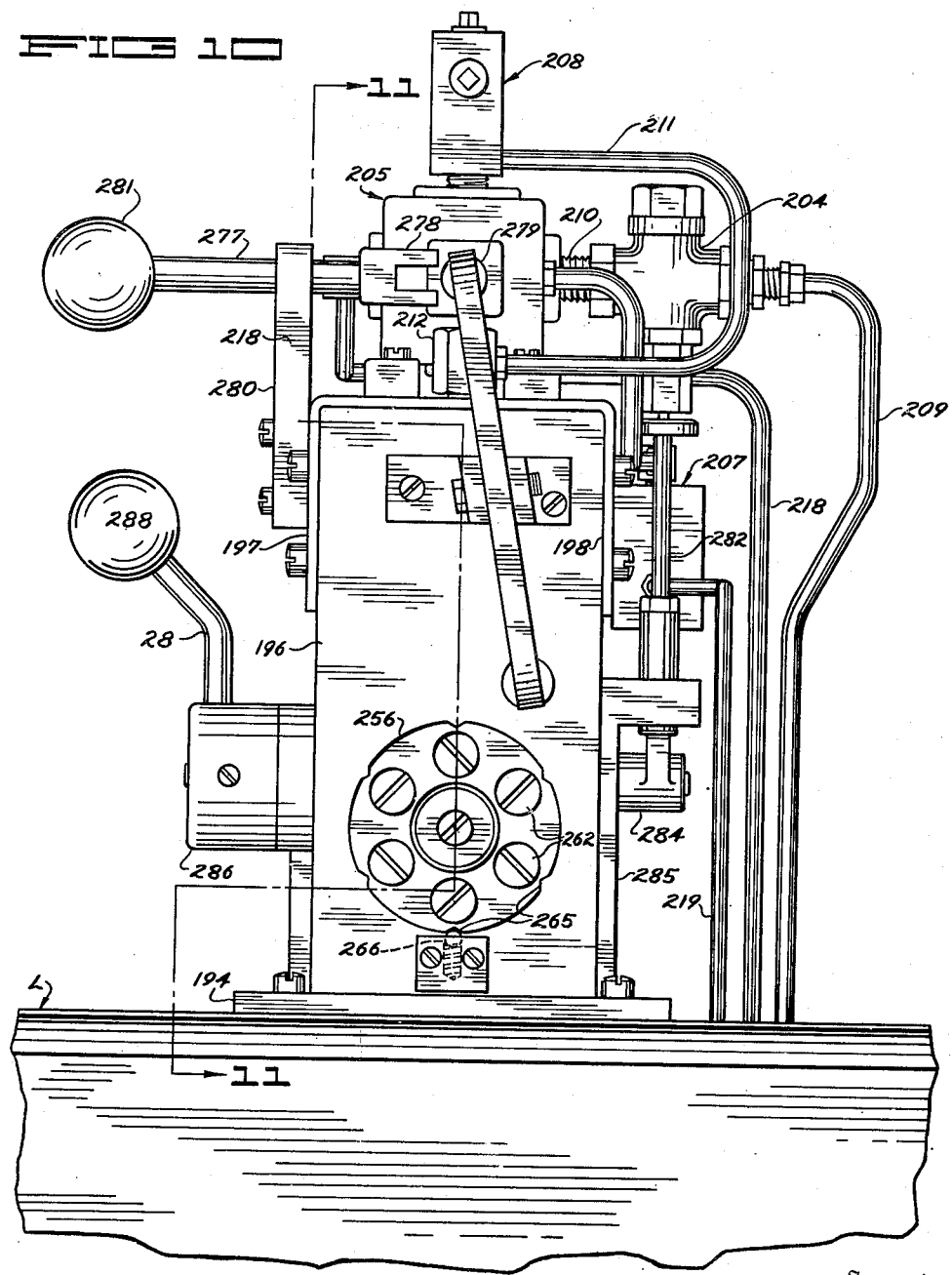

June 23, 1953    R. H. SHADRICK    2,642,649
LATHE CONTROL MECHANISM
Filed May 27, 1946    12 Sheets—Sheet 9
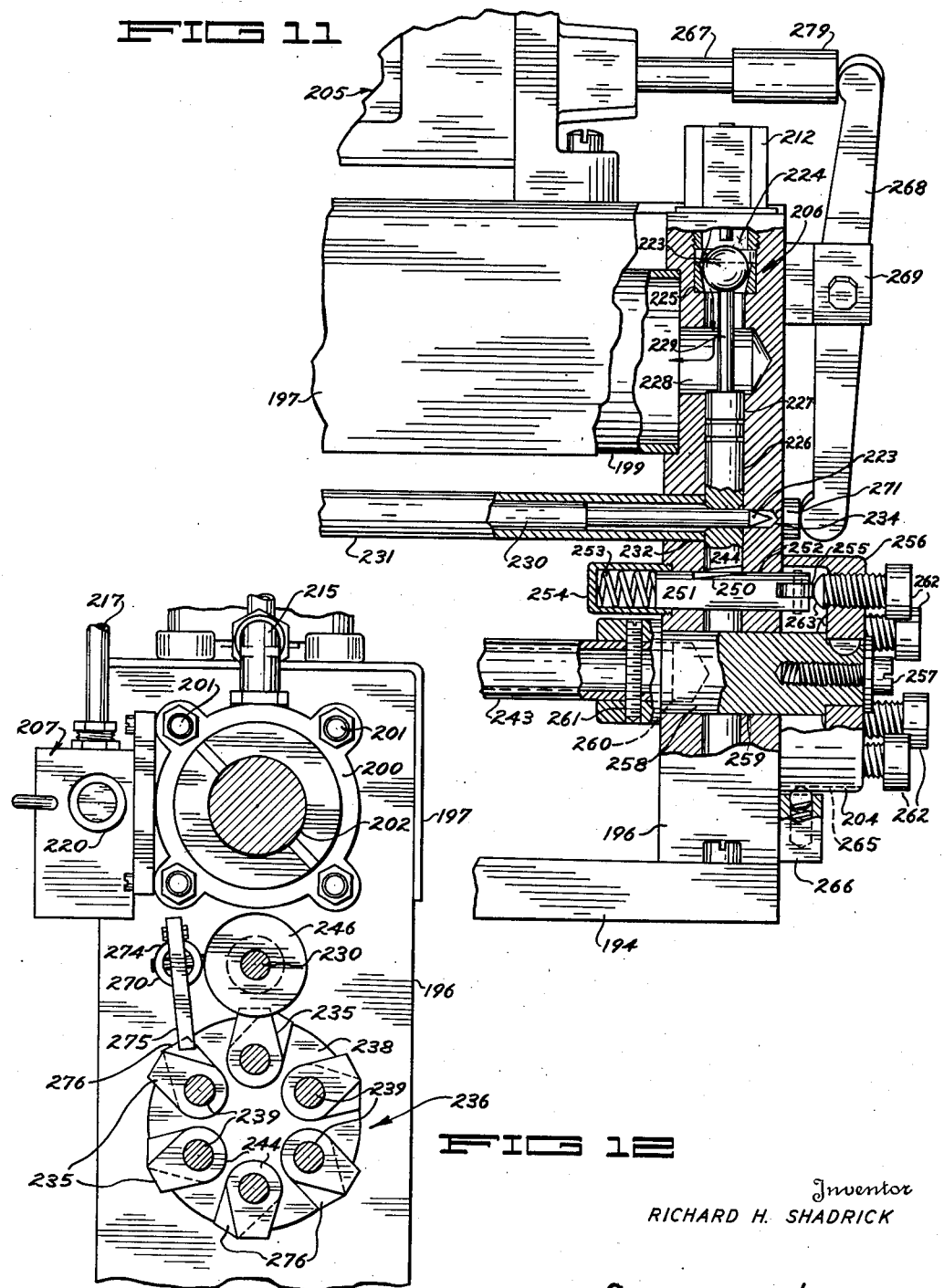
Inventor
RICHARD H. SHADRICK
By Carlsen + Hazle
Attorneys

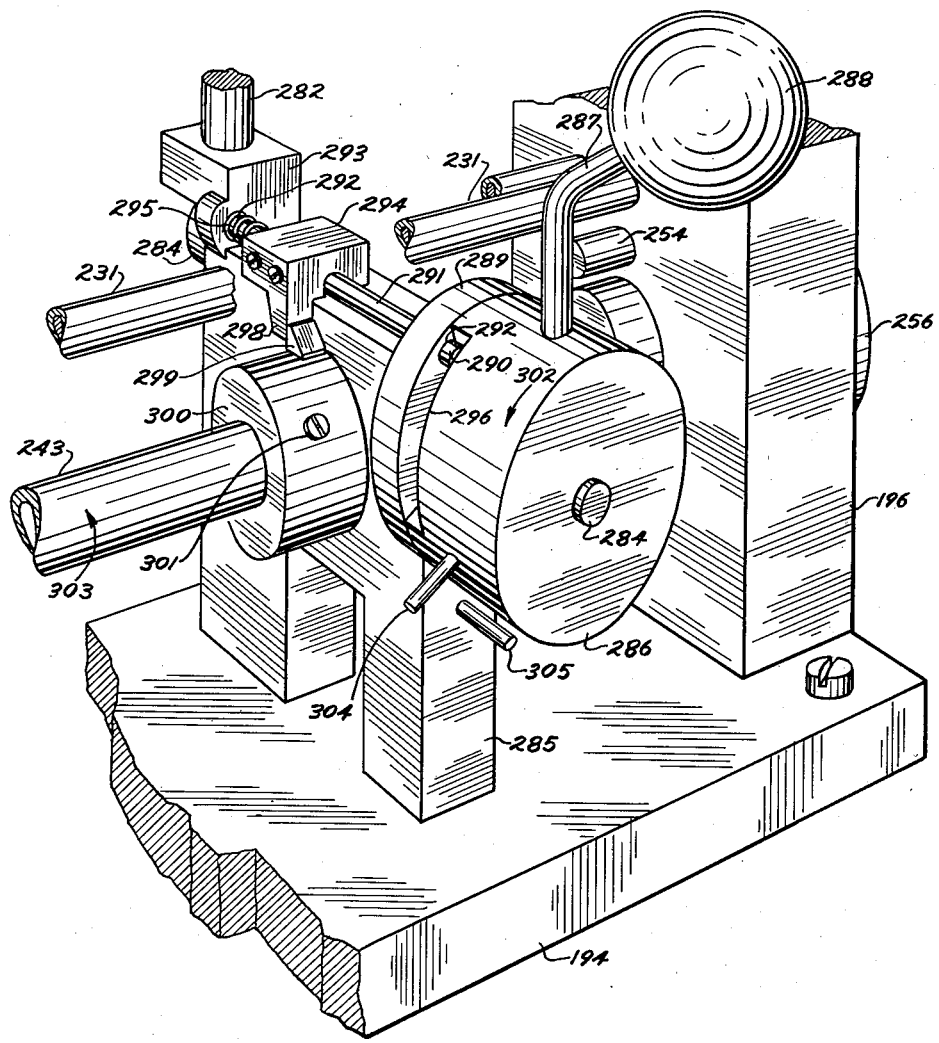

June 23, 1953 R. H. SHADRICK 2,642,649
LATHE CONTROL MECHANISM
Filed May 27, 1946 12 Sheets-Sheet 11
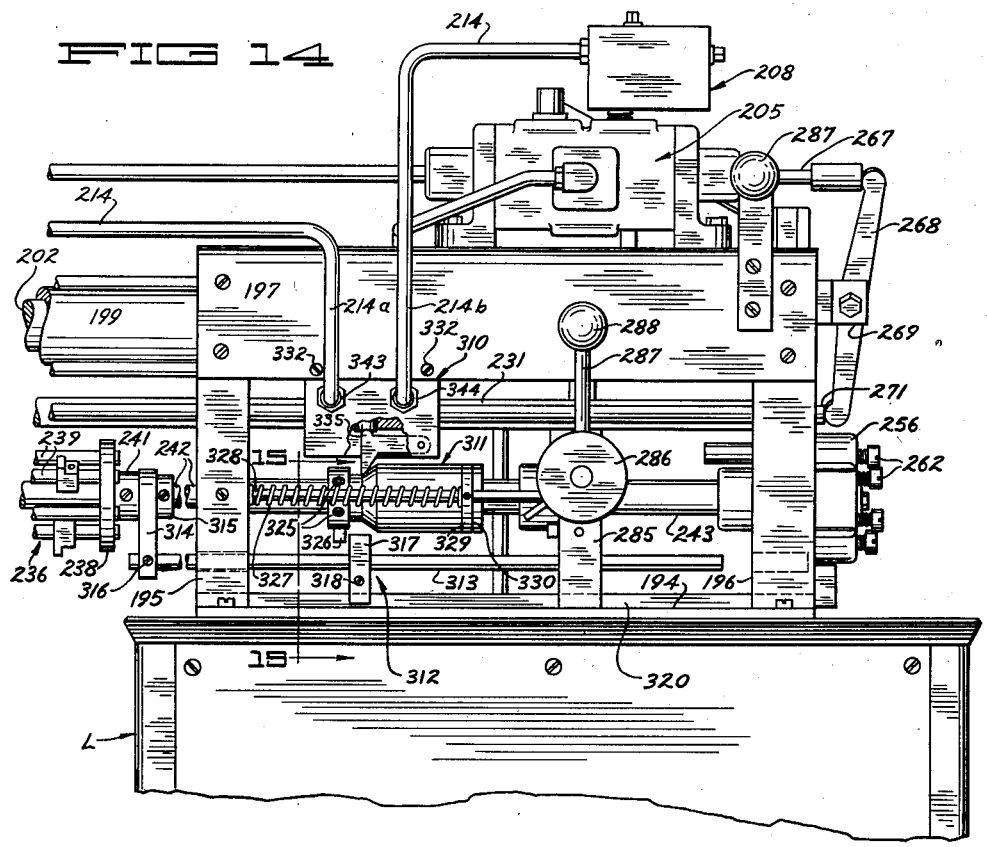
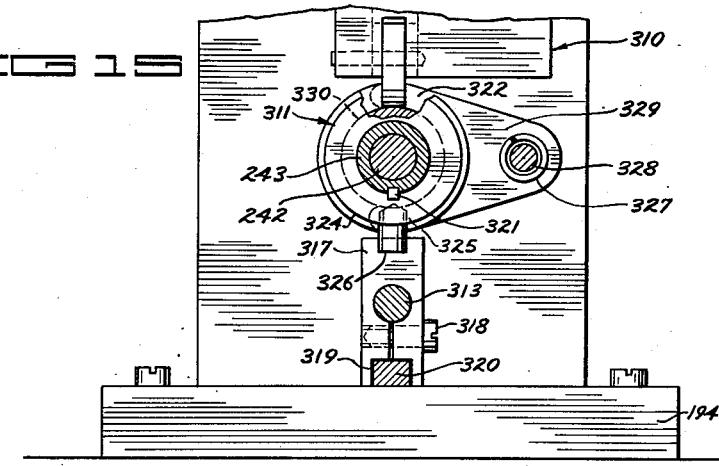
Inventor
RICHARD H. SHADRICK
Attorney

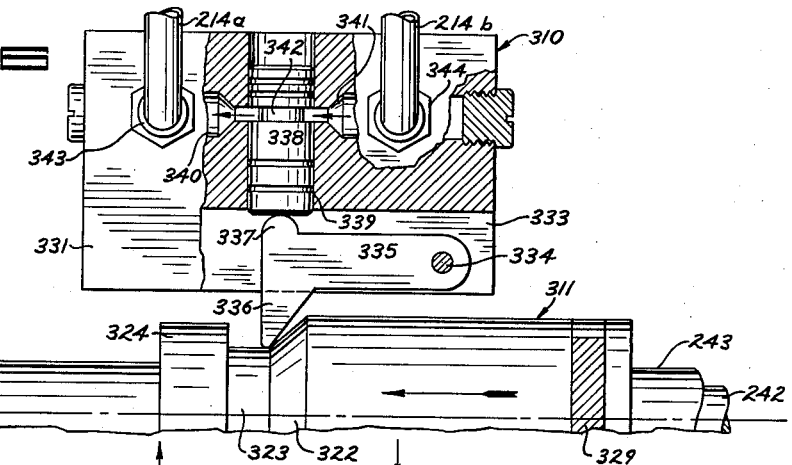
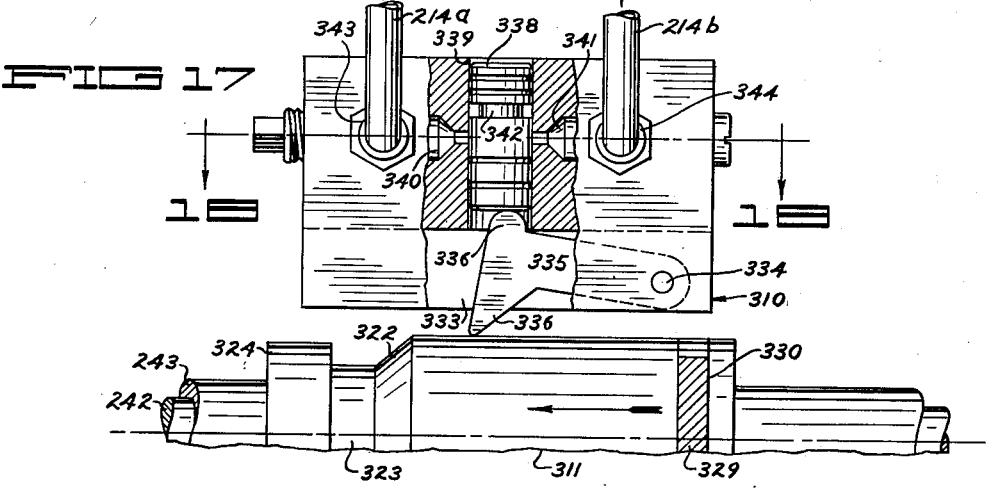
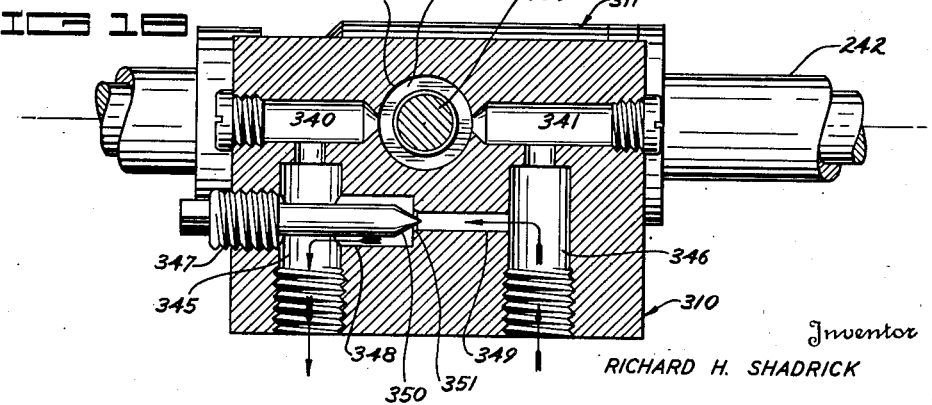

Patented June 23, 1953

2,642,649

UNITED STATES PATENT OFFICE 2,642,649

LATHE CONTROL MECHANISM

Richard H. Shadrick, Minneapolis, Minn., assignor, by mesne assignments, to Robert Hacking, Paul Hacking, and J. J. Panucci Application May 27, 1946, Serial No. 672,506

16 Claims. (Cl. 29—42)

1

This invention relates to improvements in control mechanisms for indexing tool carriers, such as the turrets used upon turret and engine lathes.

The primary object of the invention is to provide a compact, simple and efficient mechanism for installation either upon the lathe itself, or arrangement in connection therewith, and operative to move or traverse the turret, and its tools, toward and away from the work and with automatic, preselected and precise control over the feed rate.

Another object is to provide mechanism of this kind which will operate to first feed the tools toward the work at a rapid rate, then automatically shift the rate of feed to a proper cutting speed according to the characteristics of each tool, and then return the turret rapidly at the end of the working stroke, completing the traverse. Another and related important object of the present invention is to provide a feed mechanism wherein the point at which the working stroke shifts from the high advance speed to the controlled feed rate may be individually adjusted for each tool carried by the turret, thus to save all possible time in the operation of the machine.

Another object is to provide a control unit or mechanism having convenient controls and adjustments for initially setting up the machine for different feed rates as required, for stopping the work at any time and for controlling the repeat operation after all tools have operated on the work.

Another object is to provide a control mechanism useful also for tapping operations, and providing a regulated feed speed for the tap and a corresponding regulated return movement for backing out the tap.

Still another object is to provide a control mechanism of this purpose which is hydraulically actuated, which will operate smoothly under all load conditions, and has adequate power for heavy cuts but with a cushion effect and a preciseness in control making it suitable for the finest of precision work.

These and other more detailed and specific objects will be disclosed in the course of the following specification, reference being had to the accompanying drawings, in which—

Fig. 1 is a front elevation, partially broken away and in section, of a part of a turret lathe with one form of my control mechanism attached to the lathe bed and connected to the tool turret.

Fig. 2 is an enlarged end view, looking at the right hand end of the assembly of Fig. 1.

Fig. 3 is a vertical longitudinal sectional and partially diagrammatical view through the main part of the control mechanism, looking at the same from the rear, or side opposite that of Fig. 1, and illustrating the position of certain parts, as the turret approaches the end of its working stroke toward the work.

Fig. 4 is a similar view, but showing the parts in the positions assumed as the turret approaches the end of its return stroke.

Fig. 5 is a plan view of portions of the control mechanism and part of the turret slide or carrier, and illustrating the connections therebetween and the operating means for the restoring valve.

Fig. 6 is a fragmentary detail sectional view substantially along the line 6—6 in Fig. 4 and showing certain details of the feed regulating or metering valve assembly.

Fig. 7 is a front elevation of a mechanism in accordance with my invention but modified slightly from the showing of Figs. 1–6.

Fig. 8 is a rear view of the structure shown in Fig. 7.

Fig. 9 is an enlarged fragmentary rear elevation of the main valve actuating cam and adjacent parts.

Fig. 10 is an enlarged end view looking at the right hand end of the mechanism as disclosed in Fig. 7.

Fig. 11 is a fragmentary vertical sectional and elevational view substantially along the line 11—11 in Fig. 10 and showing details of the metering valve.

Fig. 12 is an enlarged vertical sectional view along the line 12—12 in Fig. 8.

Fig. 13 is an enlarged fragmentary perspective view of a portion of the mechanism showing the selective repeat control, control handle and associated parts.

Fig. 14 is a view similar to the right hand portion of Fig. 7 and showing a tapping attachment or means for selectively regulating the travel in two directions as necessary for tapping work.

Fig. 15 is an enlarged fragmentary vertical sectional view along the line 15—15 in Fig. 14.

Fig. 16 is an enlarged fragmentary detail sectional and elevational view of the tapping speed regulating or metering valve and associated parts, showing the same in inoperative or inactive position.

Fig. 17 is a similar view but showing the valve actuated to provide travel at tapping speeds.

Fig. 18 is an enlarged sectional view along the line 18—18 in Fig. 17.

Figs. 1–6

The embodiment of my invention as disclosed in Figs. 1 through 6 of the drawings will first be described. This form of the mechanism is adapted to be set up upon the lathe itself forming an attachment therefor and the lathe, of which only parts pertinent to the present disclosure are shown, is essentially conventional, comprising a bed A, a turret support B adjustable to any selected position lengthwise along the bed, a turret carrier or slide C reciprocably mounted for traversing movements in and upon the support B, and a turret or turret head D adapted to carry six, more or less, evenly radially spaced tools (not shown). The turret D is rotatable about a vertical axis and in operation is indexed around in steps to present the tools in succession to the work.

As herein shown (Fig. 1 particularly), the turret D and its carrier or slide C is moved to the left to present the tools to the work being processed, and returned to the right to withdraw the tools from the work, while the indexing operation takes place, or while a finished work piece is removed from the machine. The mechanism of my invention accomplishes these advance and return movements of turret and slide automatically as will presently appear, and the indexing of the turret takes place as the slide follows through its return stroke. This indexing movement is brought about in the conventional manner and it is sufficient to state herein that the turret carries depending, evenly spaced pins E (Fig. 1), equal in number to the tool stations on the turret, which engage a pawl F and turn the turret a step each return stroke. The pawl may, by conventional means G, be moved out of position for engaging the pins E to index the turret, when it is desired to repeat the operation of one tool. A shaft H is journaled lengthwise beneath the slide C and is rotated, as the turret is indexed, by bevel gears I which connect it to the turret, and this shaft carries a stop screw disk J in which are threaded radially spaced stop screws K equal in number to the tool stations on the turret. The purpose of these screws will presently appear.

The mechanism of my invention comprises a frame having a base 15 which is secured upon the lathe bed A adjacent the right hand end thereof in a position whereat the frame will clear the lathe slide as it reaches the end of its return stroke. End plates or members 16 and 17 extend rigidly upwardly from the ends of the base plate 15 and are tied rigidly together by front and rear tie plates 18 and 19 secured in place by screws 20, said plates 18 and 19 as seen in Fig. 2 also overlying the upper ends of the ends 16 and 17. This assembly thus forms a rigid rectangular frame and at a level above that of the turret slide C the frame supports a cylinder 21 the ends of which are recessed into and clamped tightly between the frame ends 16 and 17 (Figs. 3 and 4). A piston 22 is mounted for reciprocation in the cylinder 21 and a piston rod 23 attached to the piston extends out through the end 16 toward the adjacent end of the slide C to which this end of the rod is connected by a bracket assembly 24. This assembly comprises an angle-shaped bracket 25 secured by its base flange at 26 to the slide C and having in its upright flange an upwardly opening notch 27 in which nicely fits a diametrically reduced end portion 28 of the piston rod 23. A plate 29 is secured by a cap screw 30 crosswise to the end of the piston rod and this plate is yieldably urged away from the upstanding, notched flange of the bracket 25 by expansion coil springs 31, thus normally holding the shoulder at the junction of the piston rod with the reduced end 28 tightly against the margins of the notch 27. The foregoing arrangement is obviously such that the reciprocation of the piston 22 in the cylinder 21 will cause a corresponding movement of the slide C, the movement of the piston to the right as viewed in Figs. 3 and 4 carrying the slide (and turret D) through its advance or feed stroke, and vice versa. The springs 31 provide a shock absorbing action between the piston and slide in one direction to take up the jar which occurs when the feed movement is completed and the slide travel is sharply reversed to carry it through its rapid return stroke as will be described.

The piston 22 of the hydraulic motor constituted by the piston and its cylinder 21 is power reciprocated in both directions in the cylinder by fluid pressure supplied by a suitable pump (not shown) the output pressure of which is delivered to the machine by a supply pipe 32, and excess or displaced fluid is returned to a reservoir (also not shown) supplying the pump, by a discharge pipe 33.

Fluid from the supply pipe 32 is admitted to opposite ends of the cylinder 21 selectively and in proper sequence by a multiple valve system embodying five valves in all and these valves will now be described in order.

The primary control over the fluid flow and operation of the machine as a whole is a main control or shut off valve 33 arranged at the rear of the mechanism and having an inlet fitting 34 to which the pipe 32 is connected. Fluid is thus continuously supplied to an upper chamber 35 (Fig. 2) in the valve, above a partition 36 in which is a valve opening 37 normally closed by a spring depressed valve disk 38. The valve 38 may, however, be upwardly unseated against its spring, by a push rod 39 extending upwardly through a fitting 40 in the bottom of the valve. This push rod 39 is vertically reciprocated to open and close the valve by a cam 41 secured to the end of a shaft 42 and positioned below a lifter 43 fitted on the bottom of the push rod. A bracket 44 secured to the base plate 15 intermediate the ends 16 and 17 is horizontally bored, front to back, to rotatably receive the shaft 42 and at its rear end has an apertured lug 45 in which the lifter 43 is slidably supported above the cam 41. The forward end of the shaft 42 is bent upwardly to form a handle 46 upon the extremity of which is secured a knob 47. When the handle 46 is moved to a vertical position the nose of the cam (Figs. 3 and 4) is moved up beneath the lifter 43 to move the push rod 39 upwardly and unseat the valve disk 38, as seen in Fig. 2, while movement of the handle 46 to either side from center will cause the cam to allow the push rod to descend and the valve to close. Thus the machine may be shut off quickly by "knocking" the handle in either direction from center in an emergency. A plate 48 secured to the front end of the bracket 44 has ears 49 which lie in the path of the handle 46 limiting its "off" movement to either side and causing it to stop in a position convenient for return to "on" position.

The valve 33 also has a lower chamber 50 into which fluid will flow when valve disk 38 is opened and communicating with this chamber is a nipple 51 by which the valve is rigidly supported upon the adjacent side of, and is connected for fluid transfer to, a reversing or piston control valve indicated generally at 52. Said valve 52 is of the piston or plunger type and the operating element per se will be later described. The valve 52 comprises a housing having a longitudinal bore 53 over the ends of which are fitted and secured end castings 54 and 55 flanged to form feet 56 by which the valve may be screwed and supported atop the front and rear tie plates 18 and 19 as clearly shown. The housing or body 57 of the valve 52 is generally rectangular in shape and on the side facing the valve 33 it has a bossed and tapped opening receiving the nipple 51 and leading into an inlet chamber 58 communicating through a circumferential groove 59 with the center of the valve bore 53. On the opposite front side of the valve body 57 there is a similar bossed and tapped opening to which the return pipe 33 is connected by a suitable fitting or elbow 60 and this opening communicates with an outlet chamber 61 in the body. Said outlet chamber 61 has passages 62 and 63 leading in opposite directions and communicating with the bore 53 through grooves 64 and 65 spaced widely to opposite sides of the groove 59.

Intermediate the grooves 64 and 65 and the groove 59 the valve body 57 also has grooves 66 and 67 which communicate, respectively, with chambers 68 and 69 in the top of the valve and downwardly into which are tapped a nipple 70 and a tubing fitting 71 respectively.

The third valve in the series controlling piston 22 is a metering or feed regulating valve which is located in the frame end 17. The valve element, per se, is a ball 72 which is loosely mounted in a chamber 73 formed in the upper, center portion of the end 17 and tapped at its upwardly opening end to receive a fitting 74 from which extends a tube or line 75 to the aforesaid fitting 71 on the reversing valve 52. The valve ball 72 cooperates with a valve seat or bushing 76 seated at the bottom of the chamber 73 and downwardly tapered on its inner periphery to accommodate the ball. Upward movement of the ball is limited by a stop pin 77 depending from the fitting 74 but before the ball strikes such pin (Fig. 4) it will fully clear the seat 76.

Vertically slidable below the ball 72 is a metering plunger or piston 78 mounted in a bore 79 extending downwardly from and communicating with the seat 76. The upper end of this plunger 78 is reduced at 80 to clear the seat and will, when the plunger is moved upwardly, unseat the ball. The vertical position of the plunger 78 will thus regulate the flow past the ball 72. Substantially in alignment with the axes of the cylinder 21 the plunger 78 has a diametrical opening 81 flared or beveled out on the side nearest the cylinder and the piston 22 has affixed thereto a lifter pin 82 the extremity of which is tapered as shown at 83. This pin 82 is adapted, as the piston 22 moves on its return stroke, to penetrate the opening 81 and the tapered end 83 facilitates its entrance thereinto. The arrangement is such that, as the pin 82 enters opening 81 it will cam the plunger 78 upwardly (Fig. 4) a short distance. As the pin 82 penetrates opening 81 it enters a recess 84 in a plug 85 secured on the frame end 17, it being understood of course that said frame end 17 has openings 86 traversing the plunger bore 79 to clear the pin.

The lower end of the metering valve plunger 78 terminates just above a large opening 87 formed through the lower portion of the frame end 17 and the plunger bore 79 communicates with a central, annular enlargement or groove 88 formed around the interior of this opening. A cage member or circular disk 89 is rotatably mounted and supported in the opening 87 and is positioned upon a tubular drive sleeve or shaft 90 which extends endwise through suitable openings or bearings in the bracket 44 and frame end 16 toward and over the end of the shaft H upon which it is slidably keyed or otherwise suitably connected for driving purposes. Adjacent the disk 89 the sleeve 90 has secured thereto a hub 91 having a flange radially slotted at 92 to engage drive screws 93 in the end of the disk and the arrangement is such that the step by step rotation of the sleeve 90 by shaft H will be transmitted to the disk. The sleeve 90 has freedom for limited sliding movement with respect to the disk 89, while maintaining driving connection between the slots 92 and cap screws 93, to compensate for shocks as the machine travel reverses, but such movement is limited by collars 94 positioned on the sleeve to each side of the bracket 44.

The disk 89 projects beyond the exposed end surface of the frame end 17 some distance and is notched at equally spaced points as seen at 95 to receive a tooth 96 on a latch lever 97 which is pivoted at 98 (Fig. 2) and biased by a spring 99 to normally urge the tooth into the notches in succession as the disk is intermittently rotated. These notches 95 correspond in number and angular spacing to the tool stations on the turret D and to the stop screws K as will be understood.

In the plane of the groove 88 the disk 89 is provided with a series of evenly spaced radial recesses or bores 100 equal in number and angular spacing to, and aligned with, the notches 95 and in these recesses there are slidably positioned metering pins 101 having reduced outer ends 102 adapted successively to be brought up beneath the lower end of the plunger 78. Actually these ends of pins 101 engage a leaf spring 103 which is positioned tangentially with respect to the periphery of the disk 89 in a horizontal hole 104 bored front to back through the frame end 17. One end of the spring 103 is anchored at 105 and the spring stands between the uppermost pin 101 and lower end of the plunger 78.

The metering pins 101 are pierced with diametrically extending and oppositely tapered openings 106, intermediate their ends, which are aligned with bores 107 bored into the disk 89 inwardly from its outer end parallel with the axis about which it turns and traversing the recesses 101. These bores 107 are tapped to receive adjustment screws 108 the inner ends of which have long even tapers, as designated at 109, where they pass in and through the openings 106. The openings 106 are larger than the screws 108 and the arrangement is such that, as the screws are turned in, their ends 109, will cam against the outer margins (with respect to the axis of the assembly) of the openings 106 to move the pins 101 radially outward. The position of the pins 101, and the extent of their projection beyond the peripheral surface of the disk 89 may thus be precisely and individually adjusted by the screws 108.

The upper end portion of the plunger 78 is longitudinally grooved, as indicated at 110 with such grooves extending below the opening 81 so that fluid may flow between the valve chamber 73 and the adjacent end of the cylinder 21.

The fourth valve in the series is a restoring valve designated generally at 111 and comprising a rectangular housing 112 secured by screws 113 to the rear surface of the frame end 16. This is also a plunger or piston type valve having a reciprocable plunger 114 mounted in a bore 115 in the housing, which bore opens through the end of the housing nearest the turret slide C to pass a stem 116 extending in that direction from the plunger. The plunger has two spaced enlargements 117 and 118.

Two closely spaced ports 119 and 120 are formed in the top of the housing 112 opening into the bore 115, and in these are screwed fittings 121 and 122. A tube or line 123 connects one (121) of these fittings to the inlet chamber 58 in the reversing valve 52 by a connection 124 seen in Fig. 2, so that high pressure fluid will flow to this restoring valve 111 regardless of the condition of valve 52. The other fitting 122 is connected by a tube or line 125 to a fitting 126 which enters the bore 53 in valve 52, at the end nearest the turret.

A drain port 127 in the housing 112 also communicates with the bore 115 adjacent the end from which stem 116 projects and leads to a fitting 128 by which a connection is made to a drain line indicated diagrammatically at 129 leading to the pipe 33, or directly to the fluid reservoir.

The valve plunger 114 is movable to and between two positions, in a direction parallel to the travel of the turret slide C. In what may be called its normal position the plunger 114 is so disposed (Fig. 3) that its enlargement 117 closes the port 119 while both of ports 120 and 127 are open. Fluid may thus drain from the end of the bore 53 of reversing valve 52 through the lines 125 and 129. In its actuated position the plunger 114 is moved to the left as viewed in Figs. 3 and 4 to or slightly beyond the position of Fig. 4 and the enlargement 117 clears the port 119 while the other enlargement 118 closes the drain port 127. In this position high pressure fluid from the inlet chamber 58 in reversing valve 52 may flow through the ports 119 and 120 and line 125 into the end of the bore 53 of said valve.

The valve plunger 114 of the restoring valve 111 is moved alternately between these respective normal and actuated positions by an actuating finger 130 and a stud 130a adapted to engage a cap 131 secured to the extremity of the plunger stem 116. Said cap has a diametrically enlarged flange 132 the peripheral surface of which is beveled off as indicated at 133 toward the turret slide. The finger 130 is carried by and depends angularly downwardly and rearwardly from the head 134 of a rock shaft 135 the reduced shank of which is oscillatably supported in a tubular bearing 136 mounted in the rear end of the plate 29 secured to the end of the piston rod 23. A torsional coil spring 137 is coiled around the shaft 135 and is anchored at opposite ends at 138 and 139 to the head 134 and bearing 136 respectively. This spring angularly biases the shaft 135 so that it normally rotates in a direction to swing the lower end of the finger 130 in a rearward direction and this spring influenced movement is limited by a stud 140 carried by the shaft and playing in a slot 141 in the bearing 136 as clearly shown in Fig. 5. The axis about which the shaft 135 oscillates is parallel with the piston rod 23 and located above the valve plunger stem 116 and the arrangement is such that, as the turret slide C moves back on its return stroke the finger 130 will pass the cap 131. A guide 142 is secured by screws 143 to the valve housing 113 and projects parallel with and in spaced relation rearwardly of the plunger stem 116 and the free extremity is angled rearwardly as shown at 144. As the finger 130 now moves back toward the valve 112 on the return stroke of the slide C the finger is cammed by the end 144, as the finger passes the cap 131, to a nearly vertically depending position. The stud 130a screwed at 130b in the plate will, after the finger 130 passes cap 131, contact the same and push the plunger stem to the left as viewed in Fig. 5, thus moving the restoring valve plunger 114 from its normal to its actuated position of Fig. 4 as previously described. On the next movement of the slide C (to the right in Fig. 4) the finger will now pick-up the cap, contacting the sharp edge of the flange 132 and so pull the valve plunger back to its normal position of Fig. 3. The finger then clears the flange 132 as it swings back and travels out along the angled end 144 of the guide.

The final valve in the series, indicated generally at 145, is a back pressure valve and comprises a rectangular housing 146 having a bore 147 extending through from end to end and downwardly extending inlet and outlet ports 148 and 149 which meet some distance below the bore at a tapped recess 150 which is screwed upon the nipple 70 of the reversing valve 52. This connection not only places the two valves in communication with each other for fluid transfer but mechanically supports the valve 145 itself. The inlet port 148 is formed with a seat to accommodate a check valve ball 152 which is normally urged down to the seat by a spring 153 as clearly shown. The outlet port 149 is normally closed off by a back pressure valve piston 154 which is urged across this port, toward port 148 by a spring 155 braced between the piston and a threaded plug 156 in the adjacent end of the bore 147. Such spring biased movement of the piston 154 is limited by a stop pin 157 traversing the bore 147. The end of this bore 147 opposite the plug 156 has a fitting 158 from which extends a return tube or line 159 leading to a fitting 160 in the top of the frame end 16 and communicating through a duct 161 with the adjacent end of the cylinder 21.

The reversing valve 52 is completed by a plunger designated generally at 162 having a stem 163 extending slidably out through an opening 164 in the housing end casting 54. The opposite end of the plunger is engaged by an expansion coil spring 165 braced between the plunger and a shoulder around the opening 166 leading to the aforesaid fitting 126 and the plunger is thus urged to the left as viewed in Figs. 3 and 4 until such movement is halted by a stop shoulder 167 on its stem 163 as clearly seen in Fig. 3. This then is the normal position of this valve plunger 162 and from this position the plunger is moved to the right or toward the turret to an actuated position as seen in Fig. 4, this movement occurring as the turret D reaches the end of its feed or working stroke.

The plunger 162 has three spaced enlargements or valves 168, 169 and 170 and in normal position (Fig. 3) the enlargements 168 and 169 clear the adjacent grooves 64, 66, 59, and 67, while enlargement 170 closes the groove 65. Four ways or passages are thus open in the valve. In actuated position (Fig. 4) the enlargement 168 closes groove 64 while now enlargement 170 clears groove 65 thus again leaving four ways or passages open. The inlet chamber 58 is not closed in either position but is intermittently connected to outlet fittings 70 and 71, while the outlet or drain chamber 61 is alternately connected to these fittings as will be apparent upon comparison of Figs. 3 and 4.

The valve plunger 162 is moved to and between such positions under control of an actuating lever 171 which is fulcrumed intermediate its ends in a fork in the outer end of the cylinder plug 85, upon a pin 172. The lever extends in a generally vertical plane and its upper end is angled at 173 toward and into contact with the extremity of the plunger stem 163. The lower end of the lever depends below the level of the frame base plate 15 and is pivotally connected at 174 to a link 175 which in turn is pivoted at 176 to a push rod 177. Said rod 177 is slidably supported through bracket lugs 178 depending from the base plate 15 and extends toward and beneath the turret slide support B. A sleeve 179 is secured in and carried by the lugs and slidably supports the rod 177 extending out beyond the free end thereof as seen in Fig. 1. An expansion coil spring 180 is braced between one of the lugs 178 and a collar 181 (Figs. 3 and 4) secured on the rod 177 biases the same in a direction such that the upper end of the lever 171 will swing toward valve plunger stem 163.

Referring now to Fig. 1 I show therein a latch member or dog 182 which is pivoted on a pin 183 in the slotted end of the sleeve 179 projecting beyond the free extremity of the rod 177. This latch 182 has a hook 184 adapted to normally downwardly engage a notch 185 in the rod 177, under influence of a leaf spring 186, which tends to oscillate the latch in a clockwise direction as viewed here, thus locking the rod 177 against movement by the spring 180. An arm 187 is extended upwardly from the latch 182 into the path of the lowermost stop screw K and the arrangement is such that, as the turret slide C, which carries the disk J for the screws K, reaches the end of its desired feed or advance motion the lowermost screw K will engage the arm 187 and rock the latch 182 to and a little beyond the position of Fig. 1. The hook 184 will thus be released from the notch 185 and the spring 180 may then move rod 177 backward or to the right. On return movement of the rod 177, as will presently appear, the rod may cam up the latch hook due to its sloping edge 188 and so reengage the latch to lock the rod.

A stop is provided to limit movement of the plunger 162 of the reversing valve toward its actuated position of Fig. 4 and this stop comprises a slide 189 slidably supported in a bracket 190 secured to the front side of the frame end 17 and provided with a hand knob 191 on its forward end. The rear end of the slide has a fork 192 which may be pushed back astraddle the plunger stem 163 in position to engage an enlargement or head 193 on the outer end thereof and so stop the plunger movement short of the completion of its movement by the actuating lever 171.

Operation of Figs. 1–6

Assuming the turret slide C and turret D to be in normal position withdrawn from the work, the machine is set in operation by moving the handle 46 to its center position of Fig. 1 which, through cam 41 as previously described, opens the valve 38. High pressure fluid now flows from the supply line 32 through this valve and through the nipple 51 into the inlet chamber 58 in the reversing valve 52. The plunger 162 of this valve 52 is now in normal position of Fig. 3 and the fluid flows through grooves 59 and 67 into chamber 69 and thence out through the fitting 71 and line 75 to fitting 74 and thence into the chamber 73 of the metering valve. The ball 72 of this valve is unseated by metering plunger 78 so that it cannot act as a check and the fluid will thus flow through the grooves 110 in plunger 78 and through openings 81 and 86 into the end of the cylinder 21. Such entrance of the fluid into this end of the cylinder obviously will force the piston 22 toward the work and the movement of the piston rod 23 will be transmitted through the bracket connection 24 to the turret slide C.

Since the lifting pin 82 initially holds the metering plunger 78 well up in its bore 79 the ball 72 will stand far enough above its seat 76 so that fluid may flow rapidly into the cylinder and as a result the initial advance movement of the turret slide will be rapid. Such rapid advance or approach movement will continue until the lifting pin 82 clears the opening 81 in the metering plunger 78 whereupon the position of the plunger 78 is regulated by the adjustment of the metering pin 101 then disposed below the spring 103. Assuming the position of this metering pin 101 to be such that plunger 78 may fall as lifter pin 82 clears then at this point the speed of the advance movement of piston 22 and turret slide C will be reduced, due to ball 72 reducing the volumetric flow through the metering valve.

When the advance or feeding movement of the turret slide is completed the lowermost stop pin K will strike the arm 187 of the latch 182 causing the hook 184 to release the actuating rod 177 and the spring 180 then moves this rod to the left as viewed in Figs. 3 and 4, or opposite to the advance movement of the turret, and actuating lever 171 translates this movement to an opposite movement of the plunger 162 of the reversing valve 52 moving it to its actuated position of Fig. 4. Now the fluid flow is reversed to the cylinder 21, the flow from the pressure inlet chamber 58 of the reversing valve being through grooves 59 and 66, through nipple 70 into chamber 150 of the back pressure valve 145 and thence through port 148 past the check valve ball 152, which is unseated by the upward pressure, into the bore 147 of valve 145 and thence out through fitting 158 and into the line 159. This fluid thus enters the fitting 160 and flows through duct 161 into the end of the cylinder 21 nearest the turret exerting a pressure on the piston 22 tending to return the turret slide C toward starting position. At the same time the exhaust chamber 61 of the reversing valve, leading to discharge pipe 33, is connected through duct 63, grooves 65 and 67 to the chamber 69 which, as aforesaid, is connected to the metering valve chamber 73. Thus the fluid in cylinder 21 on the side of the piston 22, remote from the turret may discharge rapidly by unseating the ball 72 and the piston 22 will move back to starting position to complete one stroke of the turret and slide.

As such stroke is completed the turret D is indexed to bring up a new tool station toward the work, and the finger 130 now also engages the restoring valve cap 131 moving the plunger 114 of this valve 111 to actuated position (Fig. 4) at which high pressure fluid is admitted through line 123 and port 119 to its bore 115. This fluid then may flow through port 120 into fitting 122 and line 125 through fitting 126 into the end of the bore 53 of the reversing valve 52 and the high pressure thus exerted on the reversing valve plunger 62 now returns it to normal position. In so closing the fluid pressure overcomes the spring 180 and returns the actuating rod 177 to normal position at which it is again latched by latch 182.

Immediately then the fluid flow to the cylinder 21 is again reversed, the fluid under pressure flowing through the metering valve into the end of the cylinder remote from the turret to start another working stroke. The fluid ahead of the piston 22, which previously returned the parts to starting position, flows out through duct 161, fitting 160, line 159 and fitting 158 into the back pressure valve bore 147. Here the fluid is checked by ball 152 from returning to the high pressure system but the pressure of the displaced fluid is exerted against the piston 54 to move it back and clear the port 149 so that this fluid may return via the chamber 150, nipple 70, chamber 68, grooves 66 and 64 to the duct 62 leading to the discharge chamber 61 of the reversing valve and thence to discharge pipe 33. The resistance of the piston 154 to displacement by the fluid creates a back pressure on the travel of the piston 22 toward the turret such that a cushioned, chatter free feeding movement of the turret and tools is assured.

The new advance movement of the turret slide is accompanied by a return of the restoring valve plunger 114 to its normal position, by the pick-up action of the finger 130 as previously described, and thus the high pressure flow to the end of the reversing valve bore 53 is shut off. At the same time the drain port 127 is opened to the port 120 leading to the line 125 and this fluid, which previously restored reversing valve plunger 162 to normal position and relatched the actuating rod 177, is enabled to drain off, or be displaced when the reversing valve is again actuated.

Each indexing movement of the turret D, at the completion of each return stroke of the parts, is accompanied by a corresponding movement of the shaft H through the gears I. Thus each time a new metering pin 101 is brought up beneath the spring 103 so that for each successive operation a different metered rate of feed (after pin 82 clears the metering plunger 78) may be readily secured by individual adjustments of the screws 108. As previously pointed out the adjustment of these screws regulates the projection of the metering pins 101 and so regulates the position assumed by the metering plunger 78 and ball 72 for each station. The long taper of the ends of the screws 108 permits precise adjustments while the spring 103 interposed between the pins and plunger 78 ensures a constant metered flow each repeat operation for the individual stations.

The indexing operation also brings each time a new stop screw K into position for engaging the latch arm 187 and unlatching the actuating rod 177 and by adjustment of these screws it will be possible to readily adjust, for each indexed tool position, the point at which the advance or feed movement will be halted and the return movement started as will be readily apparent from an inspection of Fig. 1.

When it is desired to stop the turret with the tool therein fully advanced to the work the knob 191 is pushed back and the fork 192 thrust into the path of the head 193 in the stem 163 of the reversing valve plunger 162, before the advance movement of the turret is completed. As the stop screw K then trips the latch 182 to initiate the return movement the plunger 162 is prevented from moving to actuated position by the engagement of the head 193 with said fork 192 but instead comes to rest in a position at which enlargement 169 of the plunger closes the main inlet groove 59 and enlargement 170 closes the groove 65. Thus fluid flow to and from the cylinder 21 will be halted and the parts will rest until the fork 192 is pulled forward, whereupon the spring 180 will complete the movement of the reversing valve plunger to actuated position and the reverse movement of the turret will start up. The fork 192 is thus so positioned that it will stop the reversing valve plunger 162 from completing its movement toward actuated position by a distance slightly greater than the width of the aforesaid grooves 59 and 65.

To shut off the machine the handle 46 is, of course, moved either way from center allowing the main valve 38 to close and shut off the flow of fluid to the machine, and this may be done at any point in the operation.

Once the machine is set up the operation is completely automatic with a precisely regulated feed for each tool selectively as will be understood.

*Figs. 7–13*

It will be noted that in the machine of Figs. 1–6, the point at which the rapid approach movement of the turret to the work shifts to the chosen metered feed travel is fixed, by the length of the lifter pin 82, and is the same for all stations, or for each indexed position of the turret. This may be a disadvantage in some cases since tools of different lengths may require metered feed rates through different distances, and a constant length of metered feed movement may result, in sum, in a considerable waste of time.

Then too, the machine of Figs. 1–6 will repeat indefinitely, after all stations have been indexed, unless shut off and where a single operator attends several machines it may be a distinct advantage to have the machine automatically shut itself off after each complete cycle of operations and not so repeat.

The mechanism of Figs. 7–13 now to be described has these features of selective length of metered feed motion, and selective repeat control but otherwise is essentially like that of Figs. 1–6. To avoid needless duplication of the disclosure the valve system and other parts wherever common to both mechanisms is not shown in particular detail in Figs. 7–13.

This mechanism is further shown as a cabinet or portable type separate from and not supported upon the lathe bed. The mechanism is accordingly supported atop a base or cabinet indicated generally at L and the construction of which is itself not important to the present disclosure. It is sufficient to state that this cabinet is arranged on the floor at the end of the lathe opposite the work holder, and the cabinet may well support and enclose the pump and reservoir (not shown) which supply the fluid for operating the mechanism. Positioned on the cabinet L is a frame having a base plate 194, rigidly supported upright frame ends 195 and 196 and the front and rear tie plates 197 and 198 all arranged exactly as previously described.

The frame ends 195 and 196 support a main cylinder 199 one end of which (Fig. 11) is recessed into the end 196. This cylinder 199 is, however, longer than the frame and its opposite end therefore extends through and beyond the other frame end 195 toward the lathe slide, here again indicated at C, and this extremity is provided with a cap 200 secured in place by tie rods 201. A piston (not shown) in the cylinder 199, identical to aforesaid piston 22, is secured to a piston rod 202 which extends slidably out through the cap 200 and is attached to the turret slide C by a bracket assembly 203 exactly as previously described.

The lathe slide C also here carries a shaft H which is rotated, step by step, as the turret is indexed from station to station but this shaft does not in this case carry stop screws K as will later appear.

Here again fluid flow to the opposite ends of the cylinder 199 is controlled by five valves, designated generally as the main control or shut-off valve 204, a reversing valve 205, a metering valve 206, a restoring valve 207 and a back pressure valve 208. Aside from the metering valve 206, the construction and operation of these valves 204, 205, 207 and 208 is exactly the same as the corresponding previously described valves 33, 52, 111 and 145 and interior details are accordingly not again shown and described. It is sufficient to point out the main supply line 209 from the pump to main valve 204, the nipple 210 connecting this valve to the inlet chamber of the reversing valve 205, the line 211 connecting the output of valve 204 to the metering valve inlet fitting 212, the nipple 213 connecting valves 205 and 208, the line 214 connecting back pressure valve 208 to the end of the cylinder 199 through a fitting 215 in the cap 200, the pressure supply line 216 from the reversing valve 205 to the restoring valve 207 and the line 217 connecting the latter to the end of the valve 205 to push the plunger thereof back from actuated to normal position. There are also shown a main drain line 218 and a restoring valve drain line 219 by which displaced fluid is returned to the reservoir. These connections are all essentially identical to the corresponding connections in Figs. 1-6 and the fluid flow and operation is identically the same.

It will be noted that the restoring valve 207 is secured to the cylinder end cap 200 and its actuating cap 220 is arranged to be moved in opposite directions, as the turret slide returns to starting position from each working stroke and starts on the next, by an actuating pin 221 supported from a bar 222 secured to the main piston rod 202. Otherwise the arrangement of this valve is exactly as previously described and the operation is in no way different.

Turning now to the metering valve 206 and referring particularly to Fig. 11 it will be seen that the construction and operation are both similar to the metering valve in Figs. 1-6, and that the actual metering means is a ball 223 in a chamber 224 in the upper end of frame end 196, cooperating with a seat 225 and positioned with respect thereto by a metering plunger 226. This plunger 226 plays vertically in a bore 227 in the frame end 196 which communicates with an opening 228 leading into the adjacent end of the cylinder 199 and the upper portion of the plunger is reduced as at 229 to provide clearance for fluid in and out flow.

In the present instance, however, the metering plunger 226 is not lifted for rapid fluid flow during the rapid approach movement of the turret slide, by the piston as previously described, but is instead raised by a lifter rod 230 which is slidably supported below cylinder 199 in a sleeve 231 which extends out beneath the exposed end of the cylinder and from which extended end the rod projects even further as seen in Fig. 7. The opposite end of the lifter rod is adapted to penetrate a tapered, diametrical opening 232 in the metering plunger 226 and is pointed at 233 to cam the plunger upward in so doing. The sleeve 231 is secured on the frame ends 195 and 196 and the end 196 has an opening 234 to clear the pointed end 233 of the rod. The lifter rod 230 is pulled forward, or toward the turret, to drop the metering plunger onto its adjustable positioning means later to be described, by a series of adjustable trip dogs 235 arranged upon an indexing trip cage or carrier indicated generally at 236.

Said cage 236 comprises two spaced end plates or disks 237—238 which are rigidly connected and joined by a series of parallel rods 239 equal in number and in angular relationship to the number of tool stations in the turret. The end plate 237 is hubbed at 240 and secured upon the extremity of the shaft H and the cage assembly is thus indexed as the turret is, to bring the rods 239 in succession to the top of the assembly. The other end plate 238 is also hubbed at 241 and is secured thereby to the end of a shaft 242 coaxial to shaft H and this shaft is slidably keyed into a sleeve 243 which is journaled and supported in and through the frame ends 195 and 196 below sleeve 231.

The aforesaid trip dogs 235 are arranged one on each of the rods 239 and each dog has a set-screw equipped hub 244 by which it may be secured in any adjusted position along the length of its rod, with the dog projecting radially (Fig. 12) with respect to the axis about which the cage assembly 236 turns. A collar 245 is secured to the exposed end of the lifter rod 230 and has a flange 246 which depends into the path of the dog 235 which happens to be at the top of the case. Bearing in mind that the cage assembly 236 reciprocates with the turret slide C to which shaft H is attached it will be apparent that as the slide approaches the work one of the dogs will engage the flange of collar 245 to move the lifter rod 230 in the same direction (to the left as viewed in Fig. 11) and will thus pull the tapered rod free of the metering plunger 226 to initiate the metered feeding travel of the slide as the tool enters the work. The dogs 235 being individually adjustable lengthwise on the rods 239 and being one for each tool station, it is therefore apparent that the metering action may be set to start at any point during the advance movement of the turret slide according to the length of the individual tools and slow feed speeds will be used only as long as absolute necessary.

The return movement of the slide C is accompanied by a corresponding movement of the lifter rod 230 to again pick-up the metering plunger 226 ready for the next operation. For this purpose a large disk 247 is secured by its hub 248 upon the shaft H and is adapted as the slide and cage move back or to the right as viewed in Fig. 7 to engage the flange or collar 245 and push the tapered end of the lifter rod 230 back into the opening 232 in the metering plunger 226 as it is in Fig. 11.

To now complete the description of the metering valve reference is again made to Fig. 11. The lower end of the metering plunger 226 is beveled off at a slight angle at 249 to cooperate with a complementarily beveled face 250 on a metering pin 251 which is slidably mounted through an opening 252 in the frame end 196 below and in communication with the lower end of the bore 227. The metering pin is biased to move endwise in one direction by an expansion coil spring 253 which is braced between the inner end of the pin (with respect to frame end 196) and a spring cup 254 screwed into the enlarged tapped inner end of the opening 252. The metering pin is thus urged outwardly through and beyond the outer or exposed end surface of frame end 196 and in a direction such as to cause the angular face 250 to allow the metering plunger 226 to descend. The outer end of the metering pin is provided with a roller 255 and it will be evident that pressure on this end of the pin, moving it inward against the spring 253, will cause the beveled face 250 to wedge against the beveled end 249 of the metering plunger, urging it upward, and that the angle of the coacting wedging surfaces 249—250 is such that the position of the pin will very precisely vary the elevation of the metering plunger. The latter factor, of course, as in the previous construction, regulates the flow past the metering valve ball 223 and the rate of travel while the turret is feeding the tools to the work.

The metering pin 251 is positioned for each station selectively by an indexing cup 256 which is secured at 257 to a stub shaft 258 journaled in a bearing 259 through the frame end 196 and into which the end of the sleeve 243 is piloted or extended as at 260. A screw 261 connects the sleeve 243 and shaft 258 so that the latter, and the attached cup 256 are rotated step by step by the corresponding movements of the sleeve 243 from the indexing mechanism of the lathe. Screwed into the cup 256 are a series of metering or adjusting screws 262 the inner ends of which are rounded at 263 to engage the roller 255. These screws 262 are equal in number and angular relationship to the number of tool stations on the turret, and as each screw in succession moves to the uppermost position shown, by the indexing action, its inner end 263 will engage the rollers 255 and thus position the metering pin 251 in accordance with the position of that screw. Selective adjustment of the metered speed is thus readily made for each tool.

The cup 256 has an annular flange 264 which encloses and protects the inner ends of the screws and the roller 255, and this flange is notched at 265 to cooperate with a spring pressed detent 266 by which the cup is accurately held in its indexed positions.

The reversing valve 205 has an operating plunger (not shown) like that indicated at 162 in Figs. 1–6, and this plunger has a stem 267 extending out through one end of the valve housing for actuation by the upper end of a lever 268 which is pivoted intermediate its ends to the frame end 196 by a bracket 269. As seen in Fig. 10 the actuating lever 268 angles rearwardly toward its lower end bringing this end rearwardly of the plane of the lifter rod 230 and its sleeve 231 and arranged to the rear of this sleeve but parallel thereto is another sleeve 270 wherein is slidably mounted an actuating rod 271 corresponding exactly in function to the actuating rod 177 of Figs. 1–6. A spring 272 braced against a collar 273 on the actuating rod 271 normally urges the rod to the left as viewed in Fig. 8 against the lower end of the lever 268 and in a direction such as to move the valve plunger stem 267 toward actuated position. Such movement of the actuating rod 271 is, however, normally prevented by a latch 274 arranged exactly as is the latch 182 of Figs. 1–6 except that its trip arm 275 depends downwardly instead of upwardly. The latch 274 is positioned out over the cage 236 and the arm 275 depends near the rod 239 which is next in line to the rod uppermost in the cage assembly at any indexed position. See Fig. 12. Reversing valve trip dogs 276 are provided one on each rod 239 and spaced from the restoring valve trip dogs 235 previously described and these dogs 276, identical in construction to the dogs 239, are so positioned that, as the cage assembly moves forward toward the work during the approach and feed travel of the turret slide, the dog 276 upon the proper rod 239 will engage the latch trip arm 275. As this occurs the latch 274 is operated to unlatch the actuating rod 271 and the spring 272 then swings the lever 268 in proper direction to actuate the reversing valve 205 for returning the turret slide to starting position. The trip dogs 276 thus serve the same function exactly as the stop screws K of Figs. 1–6, and are of course readily adjustable to stop the feed movement of the turret at any point for each station.

A stop short slide 277 is also here again provided, having a fork 278 adapted to be pushed astraddle the reversing valve plunger stem 267 in the path of a head 279 formed on the extremity thereof and so stop the plunger short of its movement to actuated position by the lever 268. The turret may thus be stopped with the tool fully advanced to the work as previously described. The slide 277 is carried by a bracket 280 on the frame and has a knob 281 on its forward end.

The main or shut-off valve 204 is opened and closed by a lifter and stem assembly 282 and this is in turn moved upwardly to open the valve, or allowed to fall to close it, by a cam 283 secured to the rear end of a shaft 284. Said shaft 284 is journaled front to back through a bracket 285 secured to the base plate 194 between the frame ends 195 and 196. Forwardly of the bracket 285 the shaft has secured thereto a disk-shaped head 286 from which radially projects a handle 287 provided at its end with a knob 288 by which the shaft may be turned to manipulate the cam 283. The front of the bracket 285 is formed with a circular plate 289 against which the head 286 turns and normally projecting forwardly through an upper part of the plate 289 is the end 290 of a release pin 291 which is slidably mounted through suitable apertures 292 in the plate 289 and a rear lug portion 293 on the bracket which also supports the lifter 282. See Fig. 13. A trip block 294 is secured on the pin 291 and arranged on the pin between this block and the lug 293 is an expansion coil spring 295 which normally urges the pin forward to project its end 290 from plate 289. The head 286 has an arcuate groove 296 in its rear surface which receives the pin end 290 and when the cam 283 is moved up to bring its nose 297 up against the lifter 282 and so open the valve 204 the handle 287 is upright and the pin end 290 is at the top of the groove 296. The shape of the cam nose 296 is such, bearing in mind that the lifter and stem 282 are urged downwardly by the spring on the valve 204 which normally closes the valve, that the pressure on the cam tends to rotate it and the shaft 284 in a clockwise direction as viewed in Fig. 9 or counterclockwise direction as viewed in Fig. 13. The engagement of the pin end 290 with the groove 296 normally prevents such rotation, however, and the valve is kept open.

The trip block 294 is positioned above the sleeve 243 and has a depending ear or lug 298 which extends into the path of a cooperating lug 299 upon a collar 300 secured by a set screw 201 upon said sleeve. The sleeve 243 is rotated in steps by the indexing action of the lathe and the collar 300 is so positioned that as the final tool on the turret is moved to the work and back, or the cycle of operations completed in other words, the lug 299 will contact the lug 298 and force the rod 291 back so that its end 290 clears the groove 296. The pressure of the valve spring against the cam nose 297 then turns the shaft 284 and head 286 to the left or counterclockwise as indicated by the arrow 302 in Fig. 13. It is, of course, understood that the direction of the indexing movement of the sleeve 243 and collar 300 is such (see arrow 303 in Fig. 13) that the lug 299 moves back for this purpose. Further it will be apparent that the lugs 298 and 299 will clear on completion of the final indexing movement and that the pin 291 will thus be freed to move forward again under influence of the spring 295. However, the end 290 of the pin will contact the rear face of the head 286 and be held back thereby until the handle 287 is again moved back to its upright on position at which the valve 204 is open, whereupon the pin will snap forward as its end 290 enters the groove 296. It will be noted that the handle 287 may at any time be moved to the right to close the valve 204 in an emergency, such movement being permitted and limited by the length of the groove 296. The opposite automatic release movement of the handle by the indexing action is limited by a stop pin 304 carried by the head 286 which strikes a pin 305 on the bracket 285 when the valve 204 is fully closed.

If repeat operation of the mechanism is desired at any time the collar 300 may be readily moved back along the sleeve 243 so that its lug 299 is clear of lug 298 and the indexing action will then have no effect on the handle 287.

*Operation of Figs. 7–13*

It is believed that the operation of this form of my invention will be apparent from the foregoing without a detailed description herein. The control or operating mechanism may be readily set up in connection with the lathe and once initial adjustments are made it will advance and return the turret at any selected rate, either repeating the operation or shutting off automatically when all operations are completed, according to the position of the collar 300. The trip dogs 235 and 276 may be adjusted not only to individually control the amplitude of the entire advance travel of the turret at the respective stations but also to regulate the part of such total travel, at each station, which is metered for feeding the tools to the work.

*Figs. 14–18*

For tapping or threading work it is, of course, necessary not only to meter or regulate the feed or approach movement of the turret slide C but to correspondingly regulate the initial part of the return movement in order to back the tap out of the work without damage to the threads. For this purpose I provide a tapping attachment or mechanism which may be supplied as a part of the machine or added thereto at any time.

Referring to these figures in detail it will be noted that the control mechanism of Fig. 14 is essentially the same as that shown in Fig. 7 and that corresponding parts are given the same reference characters. The tapping mechanism or control, per se, comprises three main elements, i. e., a two-way metering valve 310, a valve actuator sleeve or cam collar 311 and a trigger mechanism 312. The latter mechanism 312 comprises a slide rod 313 slidably mounted through the frame end 195 and bracket 285 below the sleeve 243 and extending forwardly at one end adjacent the rear or outer end of the indexing trip cage 236. An arm 314 is secured on the shaft 242 and fastened against the cage hub 241 by a collar 315 and this arm depends from the cage and is secured at 316 to the rod 313. Thus rod 313 is reciprocated endwise by and in accordance with the movement of the cage 236 and the turret slide as will be understood. A trip or catch 317 is secured by a clamp screw 318 to the rod 313 and has an end projecting upwardly therefrom. The lower end of the catch 317 (Fig. 15) is notched at 319 to slidably straddle and ride a guide strip 320 secured to the frame base 194 as the rod moves back and forth.

The actuating sleeve 311 is slidably mounted on the sleeve 243 but is keyed at 321 so that it rotates with that sleeve 243 in accordance with the indexing movements of the trip cage 236. One end of the sleeve 311 is annularly beveled off to form a cam surface 322 adjacent which is a reduced neck portion 323 which meets finally a flange 324 having a series of radially opening sockets 325 in its peripheral surface. These sockets 325 are spaced angularly the same as the trip cage rods 239 and the metering valve adjustment screws, as will be understood, and in any one, more or less, of the sockets a pin 326 may be positioned. When the pin 326 reaches a downturned position, as seen in Fig. 14, it will be engaged by the upper end of the trigger 317.

Normally an expansion coil spring 327 biases the sleeve 311 toward the right as viewed in Fig. 14 and this spring is supported upon a rod 328 secured to the frame end 195 and extending endwise through a fork 329 which projects radially from the sleeve 311 and is rotatably seated in a groove 330 in the sleeve. The spring 327 is, of course, braced between the end 195 and ear 329.

The valve 310 comprises a housing 331 which is supported in any suitable manner adjacent the sleeve 311, as by screws 332 securing it to the front frame plate 197. On the side facing sleeve 311 the housing 331 has a slot 333 and pivotally supported in this slot, upon a pin 334, is a trigger 335 having a depending lug or nose portion 336 which normally rests against the neck portion 323 of sleeve 311 as seen in Figs. 14 and 16. Opposite the lug 336 there is a rounded knuckle 337 formed upon the trigger which cooperates with a piston or plunger valve 338 slidably mounted in a valve bore or cylinder 339 formed in the housing 331. This valve plunger 338 controls fluid flow between chambers 340 and 341 opening radially into the bore 339 from opposite sides. For this purpose valve plunger 338 has a diametrical groove 342 which normally registers with and forms a means of communication between said chambers. When the valve plunger is lifted, however, as seen in Fig. 17, the groove 342 is moved out of registry with the chambers and fluid flow therebetween is cut off.

Fittings 343 and 344 are screwed into the side of the valve housing 331 and communicate through passages 345 and 346 (Fig. 18) with the aforesaid chambers 340 and 341. The pipe or line 214 leading from the back pressure valve 208 to the end of the cylinder 199 next to the turret slide is broken and its ends 214ᵃ and 214ᵇ are brought down and attached to the fittings 343 and 344 thus placing valve 310 in series with the fluid supply to this end of the cylinder.

A metering valve pin 347 is threaded in one end of the valve housing 310 and passes through passage 345 into the enlarged end 348 of a by-pass 349 connecting passages 345 and 346. The pin 347 has a tapered end 350 cooperating with a restricted orifice 351 in the by-pass 349 and by adjusting the pin in or out it will be apparent that fluid flow through the by-pass may be precisely regulated.

*Operation of Figs. 14–18*

When tapping is to be done the pin 326 is arranged to come to operating position (Fig. 1) at the proper indexed station and the adjusting screw 262 of the metering valve at that station is backed out so that the metering valve then has no effect on feed rate at this particular station. Now as the cage 236 moves forward on the rapid traverse or approach stroke of the turret slide at the proper point, depending on its adjusted position, the trip 317 will engage the pin 326 and move the sleeve 311 in the same approach direction. As this occurs the cam surface 322 cams the lug 336 upward and the trigger 335 moves the valve plunger 338 up to close off the chambers 340 and 341 from each other. Previously displaced fluid has passed freely through the valve 310 but now the fluid can flow only through the by-pass 349 at a rate selected by the valve pin 347. Thus the approach movement of the turret slide is now regulated by the valve 310 to a tapping speed, and since the valve will maintain control over the fluid flow to return the turret slide until the sleeve 311 moves back to drop the trigger 335 the same speed will be maintained for backing out the tap. As many pins 326 may be used as required for the tapping operations in view as will be understood.

When the operation of the tapping mechanism is not required the pin 326 is simply removed and the control will operate normally as will be understood.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Operating mechanism for a turret lathe having a multi-station turret and a slide supported for traverse movement toward and away from the work and including indexing mechanism for indexing the turret to present successive tool stations to the work upon successive advance and return traverse movements of the slide, comprising in combination, fluid pressure operated means for moving the slide, fluid pressure metering means for regulating at least a part of the advance movement of the slide toward the work, means for individually selecting the rate of such metered travel of the slide upon successive operations thereof, and said selecting means including a member movable by the indexing mechanism of the lathe and carrying a plurality of individually adjustable metering pins and a metering valve plunger adapted to be positioned by said pins in succession, and a flat contact member adapted to be engaged with said plunger by said metering pins and operative to accurately position the plunger in accordance with the adjustment of the pins.

2. For a lathe having a traversable slide, an operating mechanism comprising fluid pressure operated means for traversing the slide, a metering valve operatively arranged to regulate fluid flow to said means and thereby control the traverse speed of the slide, the said metering valve including a movable plunger operative to control fluid flow through the valve, an adjusting member movably supported adjacent the plunger, and cooperating angular surfaces on the plunger and adjusting member for positioning the plunger responsive to adjustment of said member.

3. For a lathe having a turret, indexing mechanism for the turret, and a traversible slide carrying the turret, traversing mechanism comprising in combination fluid pressure operated means for traversing the slide, said means including a metering valve operative to regulate fluid flow and control the traverse rate of the slide, the said valve including a movable metering plunger controlling flow through the valve, a metering pin supported for movement adjacent the plunger, the said plunger and pin having coacting wedge surfaces for positioning the plunger responsive to movement of the pin, and means actuated by the said indexing mechanism for selectively adjusting the metering pin at each successive traverse movement of the slide.

4. Control mechanism for a lathe having a multi-tool turret, a traversable slide and indexing mechanism for the turret, comprising fluid pressure operated means for traversing the slide toward and away from a work piece in the lathe, valve means operative to control said fluid pressure operated means whereby it will first advance the slide toward the work at a relatively rapid rate and then retard the speed of advance to provide a regulated feed rate for each tool, and means including end members and elongated spaced rods connecting the end members and adjustable stops on the rods, said means being actuated by the indexing mechanism and adjustable to select the point during the advance of the slide at which the rapid speed is changed to a regulated speed individually for each indexed position of the turret.

5. Control mechanism for a lathe having a multi-tool turret, a traversable slide and indexing mechanism for the turret, comprising fluid pressure operated means for traversing the slide toward and away from a work piece in the lathe, valve means operative to control said fluid pressure operated means whereby it will first advance the slide toward the work at a relatively rapid rate and then retard the speed of advance to provide a regulated feed rate for each tool, a carrier member having end plates and rods rotated in steps by the indexing mechanism, and trip members separately adjustably mounted on the rods and operative upon the said valve means to individually select for each indexed position of the turret the point at which the rapid advance movement of the slide toward the work is shifted to a regulated feed rate.

6. In a control mechanism of the character described for a traversable lathe slide, a fluid cylinder and a plunger therein connected to said slide to move the same in opposite directions responsive to fluid flow into and out of opposite ends of the cylinder, a metering valve normally operative to regulate fluid flow into one end of the cylinder to move the slide toward the work at a selected feed rate, means for rendering the metering valve inoperative, and a second valve operative to regulate fluid flow both into and out of one end of the cylinder to regulate the slide movement both toward and away from the work.

7. For a turret lathe having a slide and an indexing tool turret thereon and including a turret shaft rotated on rotation of the turret, a hydraulic control attachment for moving the slide, comprising hydraulically actuated mechanism having a reciprocatable member and a rotary member, and separate means detachably connecting said reciprocatable member to the slide and the rotary member to the turret shaft.

8. For a turret lathe having a slide and an indexing tool turret thereon and including a turret shaft rotated on rotation of the turret, a hydraulic control attachment for moving the slide, comprising hydraulically actuated mechanism having a reciprocatable member and a rotary member, and separate means detachably connecting said reciprocatable member to the slide and the rotary member to the turret shaft, the said connection means between the reciprocatable member and slide including yieldable shock absorbing means.

9. Operating mechanism for a machine having a multi-station turret and a slide supported for traversing movements toward and away from the work and including indexing mechanism for indexing the turret to successive stations upon successive traversing movements of the slide, the said operating mechanism comprising a hydraulic motor operatively connected to traverse the slide, a fluid supply system for actuating the motor alternately in opposite directions and correspondingly traversing the slide, said system including a single metering valve so connected in the system as to regulate the flow of fluid to the motor as it traverses the slide toward the work, an axially movable metering pin controlling the metering valve, and a plurality of separate screw actuated means operative by the turret indexing mechanism and cooperating in succession with the metering pin to independently position the valve for the individual turret stations and regulate the traverse speed toward the work.

10. Operating mechanism for a machine having a multi-station turret and a slide supported for traversing movements toward and away from the work and including indexing mechanism for indexing the turret to successive stations upon successive traversing movements of the slide, the said operating mechanism comprising a hydraulic motor operatively connected to traverse the slide, a fluid supply system for actuating the motor alternately in opposite directions and correspondingly traversing the slide, said system including a single metering valve so connected in the system as to regulate the flow of fluid to the motor as it traverses the slide toward the work, the valve including a single axially movable actuating member, a movable member and means actuated in conjunction with the turret indexing mechanism for moving the member to successive positions as the turret is indexed, and separate means on said movable member cooperating to selectively position the actuating member of the metering valve for the different turret stations.

11. For controlling the traversable slide of a conventional turret lathe having a multi-station turret and indexing mechanism including a part rotatable step by step as the turret is indexed to present successive stations to the work, a control mechanism for advancing and retracting the slide, comprising a reversible fluid actuated motor connected to the slide, a hydraulic circuit embodying a single metering valve for controlling the rate of flow in the circuit to the motor as the slide is advanced and thereby regulating the speed of the slide, an axially movable metering pin for positioning the valve, a rotatable member positioned adjacent the valve and driven off the rotating turret part for step by step rotation thereby, and a plurality of individually manually adjustable means on said rotatable member operative to regulate the position of the metering pin and thereby regulate the speed of advance movement of the slide for each turret station.

12. For controlling the traversable slide of a conventional turret lathe having a multi-station turret and indexing mechanism including a part rotatable step by step as the turret is indexed to present successive stations to the work, a control mechanism for advancing and retracting the slide, comprising a reversible fluid actuated motor connected to the slide, a hydraulic circuit embodying a single metering valve for controlling the rate of flow in the circuit to the motor as the slide is advanced and thereby regulating the speed of the slide, an axially movable metering pin for positioning the valve, a rotatable member positioned adjacent the valve and driven off the rotating turret part for step by step rotation thereby, and a plurality of individually adjustable screw threaded means on said rotatable member cooperating to adjust the metering pin for each turret station.

13. For controlling the traversable slide of a conventional turret lathe having a multi-station turret and indexing mechanism including a part rotatable step by step as the turret is indexed to present successive stations to the work, a control mechanism for advancing and retracting the slide, comprising a reversible fluid actuated motor connected to the slide, a hydraulic circuit embodying a single metering valve for controlling the rate of flow in the circuit to the motor as the slide is advanced and thereby regulating the speed of the slide, the said valve including an axially movable plunger member controlling fluid flow through the valve, a rotatable member driven by the rotatable turret part for step by step movements as the turret is indexed, and a plurality of separately manually adjustable means carried by said rotatable member and operative to position the plunger member endwise and individually regulate the flow through the valve for each turret station.

14. For controlling the traversable slide of a conventional turret lathe having a multi-station turret and indexing mechanism including a part rotatable step by step as the turret is indexed to present successive stations to the work, a control mechanism for advancing and retracting the slide, comprising a reversible fluid actuated motor connected to the slide, a hydraulic circuit embodying a single metering valve for controlling the rate of flow in the circuit to the motor as the slide is advanced and thereby regulating the speed of the slide, a rotatable member driven by the rotating turret part for step by step movements as the turret is indexed, the metering valve including a flow regulating plunger movable radially with respect to the said rotatable member, and a series of individually adjustable members on said rotatable member operative by the step by step rotation thereof to come in succession into position operative to selectively position the valve plunger for each turret station.

15. For controlling the traversable slide of a conventional turret lathe having a multi-station turret and indexing mechanism including a part rotatable step by step as the turret is indexed to present successive stations to the work, a control mechanism for advancing and retracting the slide, comprising a reversible fluid actuated motor connected to the slide, a hydraulic circuit embodying a single metering valve for controlling the rate of flow in the circuit to the motor as the slide is advanced and thereby regulating the speed of the slide, a rotatable member driven from the rotating turret part for step by step rotation as the turret is indexed, the metering valve including a flow regulating plunger movable toward and away from said rotatable member, separately adjustable means on the rotatable member operative to position the valve plunger for each turret station, a member connected to and operated by the slide and normally holding the valve plunger away from said adjustable means and in a position for maximum fluid flow through the valve, and the said member being operative after the advance movement of the slide has reached a predetermined point to release the valve plunger and place it under control of said adjustable means.

16. Control mechanism for a lathe having a multi-tool turret, a traversable slide and indexing mechanism for the turret, comprising fluid pressure operated means for traversing the slide toward and away from a work piece in the lathe, valve means operative to control said fluid pressure operated means whereby it will first advance the slide toward the work at a relatively rapid rate and then retard the speed of advance to provide a regulated feed rate for each tool, means actuated by the indexing mechanism and adjustable to select the point during the advance of the slide at which the rapid speed is changed to a regulated speed individually for each indexed position of the turret, and means also actuated by the indexing mechanism and adjustable to select the point at which the advance of the slide is halted individually for each indexed position of the turret.

RICHARD H. SHADRICK.

References Cited in the file of this patent
UNITED STATES PATENTS

| Number | Name | Date |
| --- | --- | --- |
| 1,282,152 | Warren | Oct. 22, 1918 |
| 1,936,446 | Burrell | Nov. 21, 1933 |
| 2,008,010 | Foster | July 16, 1935 |
| 2,047,181 | Ferris | July 14, 1936 |
| 2,071,786 | Ferris et al. | Feb. 23, 1937 |
| 2,078,698 | Svenson | Apr. 27, 1937 |
| 2,116,376 | Anderson | May 3, 1938 |
| 2,253,492 | Bakewell | Aug. 26, 1941 |
| 2,289,957 | Godfriaux | July 14, 1942 |
| 2,318,177 | Mathias | May 4, 1943 |
| 2,357,514 | Huennekens et al. | Sept. 5, 1944 |
| 2,368,408 | Brooking | Jan. 30, 1945 |